(12) United States Patent
Ogyu et al.

(10) Patent No.: US 7,850,757 B2
(45) Date of Patent: Dec. 14, 2010

(54) HONEYCOMB FILTER AND METHOD FOR MANUFACTURING THE SAME

(75) Inventors: Kazutake Ogyu, Ibi-gun (JP); Yusuke Kondo, Ibi-gun (JP)

(73) Assignee: IBIDEN Co., Ltd., Ogaki-shi (JP)

( * ) Notice: Subject to any disclaimer, the term of this patent is extended or adjusted under 35 U.S.C. 154(b) by 286 days.

(21) Appl. No.: 12/128,848

(22) Filed: May 29, 2008

(65) Prior Publication Data

US 2008/0295470 A1    Dec. 4, 2008

(30) Foreign Application Priority Data

May 29, 2007    (WO) .................. PCT/JP2007/060929

(51) Int. Cl.
 *B01D 39/20* (2006.01)
(52) U.S. Cl. .................. 55/523; 55/524; 55/DIG. 30; 422/177; 422/180; 428/116
(58) Field of Classification Search ........... 55/482–485, 55/523, 524, DIG. 30; 422/177–180; 428/116
See application file for complete search history.

(56) References Cited

U.S. PATENT DOCUMENTS

| | | | | |
|---|---|---|---|---|
| 5,034,023 | A * | 7/1991 | Thompson | .................. 205/634 |
| 7,455,709 | B2 * | 11/2008 | Ohno et al. | .................. 55/523 |
| 7,521,025 | B2 * | 4/2009 | Ohno et al. | .................. 422/168 |
| 7,559,967 | B2 * | 7/2009 | Oya et al. | .................. 55/523 |
| 7,576,035 | B2 * | 8/2009 | Ohno et al. | .................. 502/439 |
| 7,603,852 | B2 * | 10/2009 | Ohno | .................. 60/297 |
| 7,662,458 | B2 * | 2/2010 | Ninomiya et al. | .................. 428/116 |
| 2005/0266991 | A1 | 12/2005 | Ohno et al. | |
| 2006/0075731 | A1 | 4/2006 | Ohno et al. | |
| 2007/0148402 | A1 | 6/2007 | Ohno et al. | |
| 2007/0289275 | A1 | 12/2007 | Ohno et al. | |
| 2008/0083201 | A1 | 4/2008 | Oya et al. | |
| 2008/0176013 | A1 | 7/2008 | Ohno et al. | |
| 2008/0242535 | A1* | 10/2008 | Liu et al. | .................. 502/232 |
| 2008/0276586 | A1 | 11/2008 | Oya et al. | |
| 2008/0289307 | A1 | 11/2008 | Ogyu et al. | |

(Continued)

FOREIGN PATENT DOCUMENTS

EP    1541216    6/2005

(Continued)

*Primary Examiner*—Michael A Marcheschi
*Assistant Examiner*—Robert A Clemente
(74) *Attorney, Agent, or Firm*—Ditthavong Mori & Steiner, P.C.

(57) ABSTRACT

A honeycomb filter includes a pillar-shaped honeycomb structure integrally formed, first and second lamination members, a metal casing containing the honeycomb structure and the lamination member, and first and second end members connected to first and second end portions of the casing, respectively to secure the honeycomb structure and the lamination member. The honeycomb structure includes a wall portion defining through holes which extend substantially along a longitudinal direction of the honeycomb structure, each of the through holes being sealed at either one end portion. Each of the lamination members has aligned through holes extending substantially along the longitudinal direction. The honeycomb structure and lamination members include inorganic fibers oriented substantially perpendicular to the longitudinal direction. The lamination members are provided at first and second end faces of the honeycomb structure, respectively to align the aligned through holes with the through holes of the honeycomb structure.

26 Claims, 10 Drawing Sheets

U.S. PATENT DOCUMENTS

2008/0295470 A1   12/2008   Ogyu et al.

FOREIGN PATENT DOCUMENTS

| EP | 1736225 | 12/2006 |
|---|---|---|
| EP | 1780187 | 5/2007 |
| EP | 1849513 | 10/2007 |
| EP | 1852406 | 11/2007 |
| JP | 8-238432 | 9/1996 |
| WO | WO 2005/000445 | 1/2005 |
| WO | WO 2005/005018 | 1/2005 |
| WO | WO 2006/117899 | 11/2006 |

* cited by examiner

Forming direction of through holes

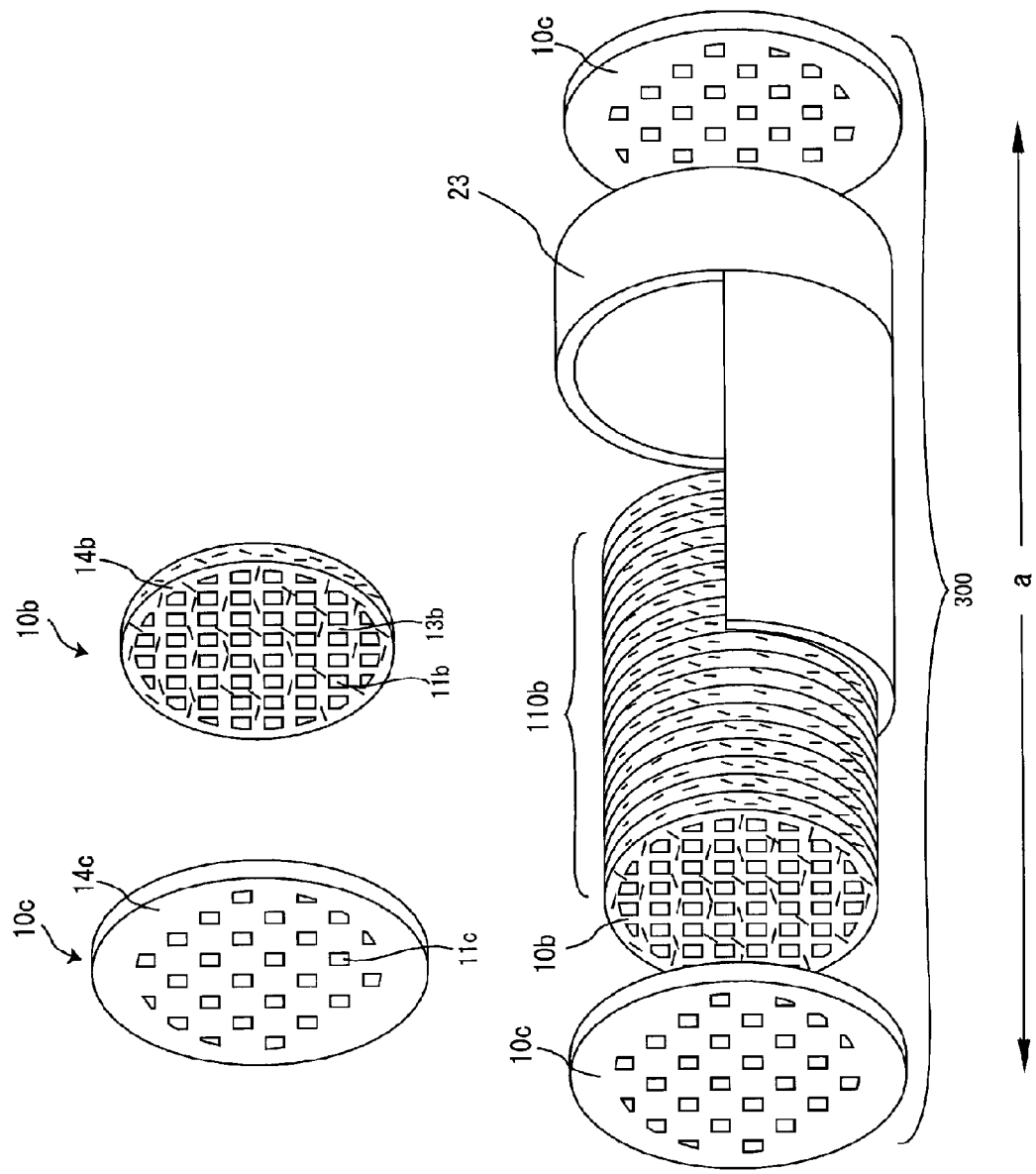

HONEYCOMB FILTER AND METHOD FOR MANUFACTURING THE SAME

CROSS-REFERENCE TO RELATED APPLICATIONS

The present application claims priority under 35 U.S.C. §119 to PCT Application No. PCT/JP2007/060929, filed May 29, 2007, the contents of which are incorporated herein by reference in their entirety.

BACKGROUND OF THE INVENTION

1. Field of the Invention

The present invention relates to a honeycomb filter and a method for manufacturing a honeycomb filter.

2. Discussion of the Background

Conventionally, particulate matter (hereinafter, also referred to as PM) is contained in exhaust gases discharged from an internal combustion engine such as a diesel engine, and in recent years, this PM has raised serious problems as contaminants harmful to the environment and the human body.

For this reason, various filters using ceramics honeycomb filters including cordierite, silicon carbide or the like have been proposed as filters that capture PM in exhaust gases to purify the exhaust gases.

Moreover, a honeycomb filter formed by a honeycomb structure of a lamination type manufactured by laminating lamination members including inorganic fibers is known (for example, see WO2005/005018 A1, WO2005/000445 A1).

WO2005/005018 A1 discloses a honeycomb filter in which a large number of lamination members mainly including inorganic fibers are laminated and the laminated lamination members are fixed in a metal casing by a pressure from end members on both ends thereof.

Further, WO2005/000445 A1 discloses a honeycomb filter using a lamination member in which inorganic fibers are oriented more along a direction perpendicular to a forming direction of through holes than a direction parallel to the forming direction of through holes.

FIG. 10A is a perspective view schematically showing a lamination member and an end member forming the honeycomb filter described in WO2005/005018 A1, and FIG. 10B is a perspective view schematically showing a state of manufacturing a honeycomb filter using the lamination members and the end members shown in FIG. 10A.

Here, in FIG. 10B, an upper portion of the round pillar-shaped metal casing is not shown.

As shown in FIG. 10B, in a honeycomb filter 300 described in WO2005/005018 A1, a laminated body 110b is formed by laminating sheet-shaped lamination members 10b each having a large number of through holes 11b and a wall portion 13b separating the through holes 11b as shown in FIG. 10A, so that the through holes 11b are superposed on one another in a longitudinal direction (the direction shown by an arrow "a" in FIG. 10B).

Here, the state in which the lamination members 10b are laminated so that the through holes 11b are superposed on one another refers to a state in which lamination members 10b are laminated so that each of the through holes 11b formed in the adjacent lamination members 10b communicate with each other.

Moreover, an end member 10c having through holes 11c formed in a checkered pattern therein is placed on an end portion of the laminated body 110b and the end member 10c is fixed to a metal casing 23 under pressure in a direction towards the laminated body 110b.

Accordingly, the laminated body 110b is sealed at either end of each of communicating through holes by the end member 10c.

In the honeycomb filter 300 having this kind of structure, exhaust gases flowing into the through hole 11b having an opening at one end face are allowed to flow out from another through hole 11b having an opening at the other end face after passing through the wall portion 13b. While the exhaust gases flow to pass through the wall portion 13b, PM contained in the exhaust gases is captured by the wall portion 13b, and thus, the exhaust gases are purified.

The contents of WO2005/005018 A1 and WO2005/000445 A1 are incorporated herein by reference in their entirety.

SUMMARY OF THE INVENTION

According to one aspect of the present invention, a pillar-shaped honeycomb filter includes a pillar-shaped honeycomb structure, first and second lamination members, a metal casing, and first and second end members. The pillar-shaped honeycomb structure is integrally formed and includes a wall portion defining a plurality of through holes which extend substantially along a longitudinal direction of the honeycomb structure. The honeycomb structure includes inorganic fibers that are oriented substantially along the longitudinal direction. Each of the first and second lamination members has a plurality of aligned through holes which extend substantially along the longitudinal direction and includes inorganic fibers that are oriented substantially along a direction perpendicular to the longitudinal direction. The first and second lamination members are provided at first and second end faces of the honeycomb structure, respectively to align the aligned through holes with the through holes of the honeycomb structure. The metal casing contains the honeycomb structure and the lamination member. The first and second end members have through holes and are connected to first and second end portions of the metal casing, respectively to secure the honeycomb structure and the lamination member. Each of through holes of the honeycomb filter formed by the honeycomb structured body, first and second lamination members, and first and second end members is sealed at either one end portion.

According to another aspect of the present invention, a pillar-shaped honeycomb filter including a honeycomb structure is manufactured. A mixture containing inorganic fibers is extruded to manufacture an elongated honeycomb molded body. The elongated honeycomb molded body is cut to manufacture a honeycomb molded body. The honeycomb molded body is dried. The dried honeycomb molded body is fired to manufacture the honeycomb structure including a wall portion defining a plurality of through holes which extend substantially along a longitudinal direction of the honeycomb structure. A sheet forming process is carried out on a sheet-forming slurry containing inorganic fibers to manufacture precursors of first and second lamination members. The precursors of the first and second lamination members are dried to manufacture the first and second lamination members each having a plurality of through holes each separated by a wall portion and penetrating from one face to another face of each of the first and second lamination members. A first end member and a second end member each having through holes formed in a checkered pattern are manufactured. The first end member is fixed to one end portion of a metal casing. The first end member, one or more the first lamination members, the honeycomb structure, and one or more the second lamination members are sequentially laminated into the metal casing, wherein through holes of the first end member, through holes of one or more the first lamination members, through holes of the honeycomb structure, and through holes of one or more the second lamination members communicate with one another. The second end member are laminated on an end face of one or more the second lamination members, wherein through holes of the second end member and the through holes of one or more the second lamination members communicate with one another, and the through holes of the first end member and the through holes of the second end member are not aligned with one another. Pressure is applied to the end face of the second end member in a direction of through holes which extend substantially along the longitudinal direction of the honeycomb structure. The second end member and the metal casing which come into contact with one another are fixed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 10A is a perspective view schematically showing a lamination member and an end member forming a conventional honeycomb filter (see WO2005/005018 A1), and FIG. 10B is a perspective view schematically showing a state of manufacturing a honeycomb filter using the lamination members and the end members shown in FIG. 10A.

DESCRIPTION OF THE EMBODIMENTS

Figure 1:
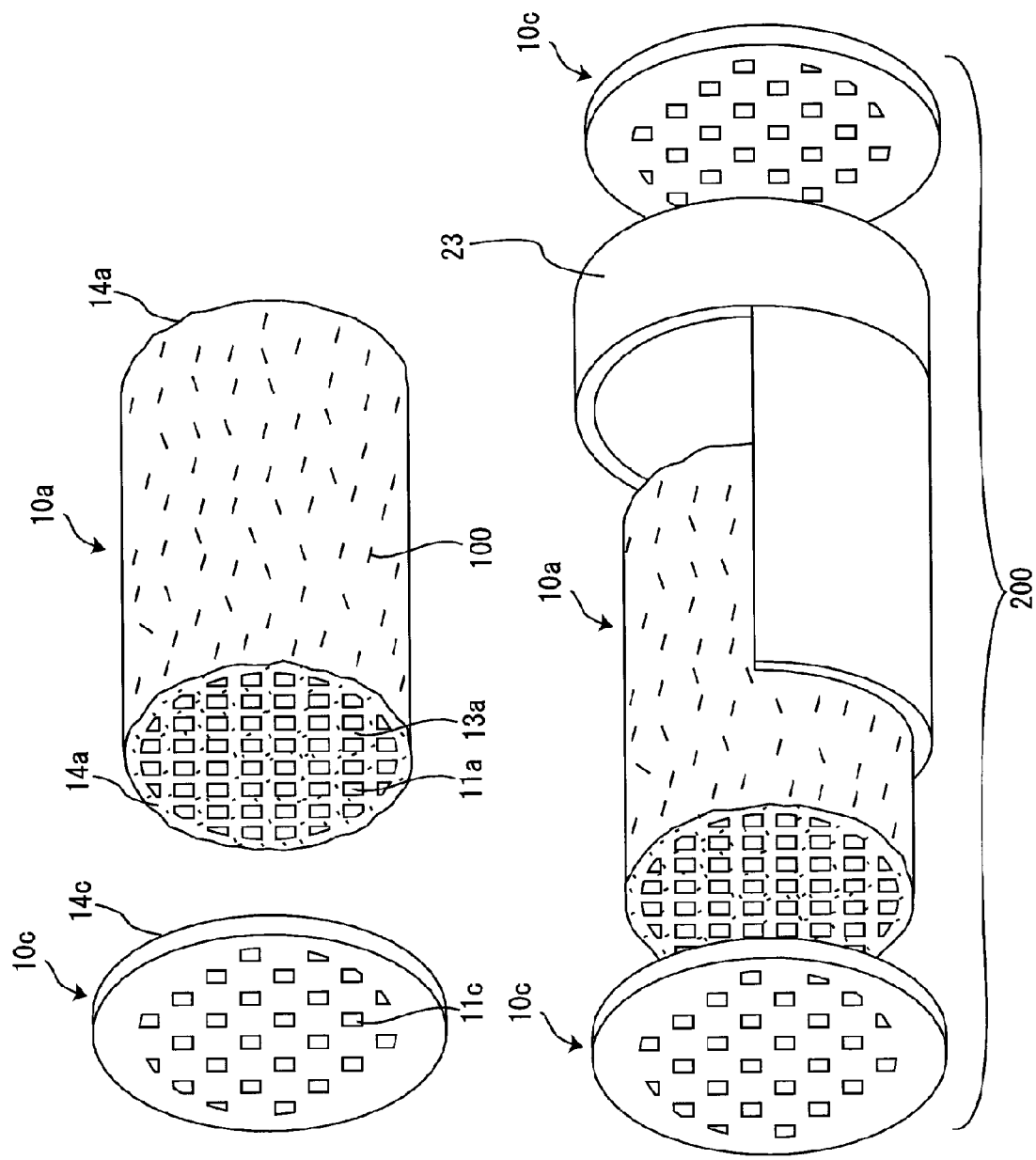
FIG. 1A is a perspective view schematically showing a pillar-shaped honeycomb structure according to one embodiment of the present invention mainly including inorganic fibers and an end member.
FIG. 1B is a perspective view schematically showing a state of manufacturing a honeycomb filter using the honeycomb structure and the end members shown in FIG. 1A.

The embodiments will now be described with reference to the accompanying drawings, wherein like reference numerals designate corresponding or identical elements throughout the various drawings.

A honeycomb filter according to the embodiments of the present invention is a pillar-shaped honeycomb filter mainly including inorganic fibers and having a plurality of through holes longitudinally placed in parallel with one another with a wall portion between the through holes, each of the through holes being sealed at either one end portion, the honeycomb filter including: a pillar-shaped honeycomb structure, which is integrally formed, including the inorganic fibers that are oriented more along a forming direction of through holes of the honeycomb structure; a lamination member including the inorganic fibers that are oriented more along a direction perpendicular to a forming direction of through holes of the lamination member and being laminated respectively on both end faces of the honeycomb structure with the through holes of the lamination member superposed on the through holes of the honeycomb structure; a metal casing for installing the honeycomb structure and the lamination member; and an end member fixed to both end portions of the metal casing, and in the metal casing, the honeycomb structure and the lamination member are fixed by the end member.

A method for manufacturing a pillar-shaped honeycomb filter according to the embodiments of the present invention mainly includes inorganic fibers and has a plurality of through holes longitudinally placed in parallel with one another with a wall portion between the through holes, each of the through holes being sealed at either one end portion, the method including: manufacturing a honeycomb structure having a plurality of through holes longitudinally placed in parallel with one another with a wall portion between the through holes by: extruding a mixture containing inorganic fibers to manufacture an elongated honeycomb molded body; cutting the obtained elongated honeycomb molded body to manufacture a honeycomb molded body; drying the obtained honeycomb molded body; and then firing the honeycomb molded body; manufacturing lamination members each having a large number of through holes penetrating from one face to the other face of the lamination member and each separated by a wall portion by: carrying out a sheet forming process on a sheet-forming slurry containing inorganic fibers to manufacture precursors of the lamination members; and drying the precursors of the lamination members; manufacturing a first end member and a second end member each with through holes formed in a checkered pattern; fixing the first end member to one end portion of a metal casing; sequentially laminating the first end member, one piece of the lamination members, the honeycomb structure, and an other piece of the lamination members into the metal casing, wherein through holes of the first end member, through holes of the one piece of the lamination members, through holes of the honeycomb structure, and through holes of the other piece of the lamination members communicate with one another; and laminating the second end member on an end face of the other piece of the lamination members, wherein through holes of the second end member and the through holes of the other piece of the lamination members communicate with one another, and the through holes of the first end member and the through holes of the second end member are not superposed on one another; applying pressure to the end face of the second end member in a direction parallel with a forming direction of the through holes; and fixing the second end member and the metal casing which come into contact with one another.

According to the honeycomb filter in accordance with the embodiments of the present invention, the honeycomb filter is formed by an integrally formed honeycomb structure in a pillar shape, which mainly includes inorganic fibers. Since the integrally formed honeycomb structure does not have a lamination interface, that is, a part in which inorganic fibers are comparatively densely distributed, the honeycomb filter tends to have a low pressure loss.

Here, each of the lamination members that includes inorganic fibers and forms the honeycomb filter as shown in WO2005/005018 A1 or WO2005/000445 A1 is manufactured by carrying out a sheet-forming process using a mesh on a slurry prepared by adding a sufficient amount of water to inorganic fibers, an organic binder, an inorganic binder and the like. On a surface portion of the lamination member manufactured by the above method, inorganic fibers tend to be distributed more densely in comparison with the inner portion thereof.

In a case where a plurality of the lamination members of this kind are laminated and a pressure is applied thereto so that a honeycomb filter is formed, since the surface portions having inorganic fibers more densely distributed are compressed each other, the inorganic fibers are presumably more densely distributed on a border face (lamination interface) of the lamination members in comparison with the other portions. Here, it is more difficult to allow exhaust gases to pass through a portion in which inorganic fibers are comparatively densely distributed than to allow them to pass through the other portions. Therefore, there is a problem that, though the honeycomb filter including the lamination members in which inorganic fibers are densely distributed has a lower pressure loss than the honeycomb filter including a ceramic, the pressure loss is hardly enough low to use as a filter for purifying exhaust gases.

It was found that a pillar-shaped honeycomb structure without a lamination interface can be manufactured by manufacturing an elongated honeycomb molded body through integrally forming a material mainly including inorganic fibers, and conducting a drying treatment and a heat treatment after cutting the honeycomb molded body into a predetermined length.

FIG. 1A is a perspective view schematically showing a pillar-shaped honeycomb structure according to one embodiment of the present invention mainly including inorganic fibers and an end member, and FIG. 1B is a perspective view schematically showing a state of manufacturing a honeycomb filter using the honeycomb structure and the end members shown in FIG. 1A.

As shown in FIG. 1A, a honeycomb structure 10*a* is formed by integrally forming a material mainly including inorganic fibers 100 into a pillar shape and a plurality of through holes 11*a* are longitudinally placed in parallel with each other with a wall portion 13*a* therebetween. Further, in the end member 10*c*, through holes 11*c* are formed in a checkered pattern on a disk-shaped metal member.

Here, a honeycomb filter 200 was provided by placing the honeycomb structure 10*a* in a metal casing 23 and by sealing either one end portion of each of the through holes 13*a* of the honeycomb structure 10*a* with the end members 10*c*, as shown in FIG. 1B.

Since this honeycomb filter 200 mainly includes the honeycomb structure 10*a* without a lamination interface, the honeycomb filter 200 tends to have a low pressure loss.

However, in this kind of honeycomb filter, a capture efficiency of PM becomes lower. Therefore, a cause of lowering of the capture efficiency of PM was studied.

Figure 2:
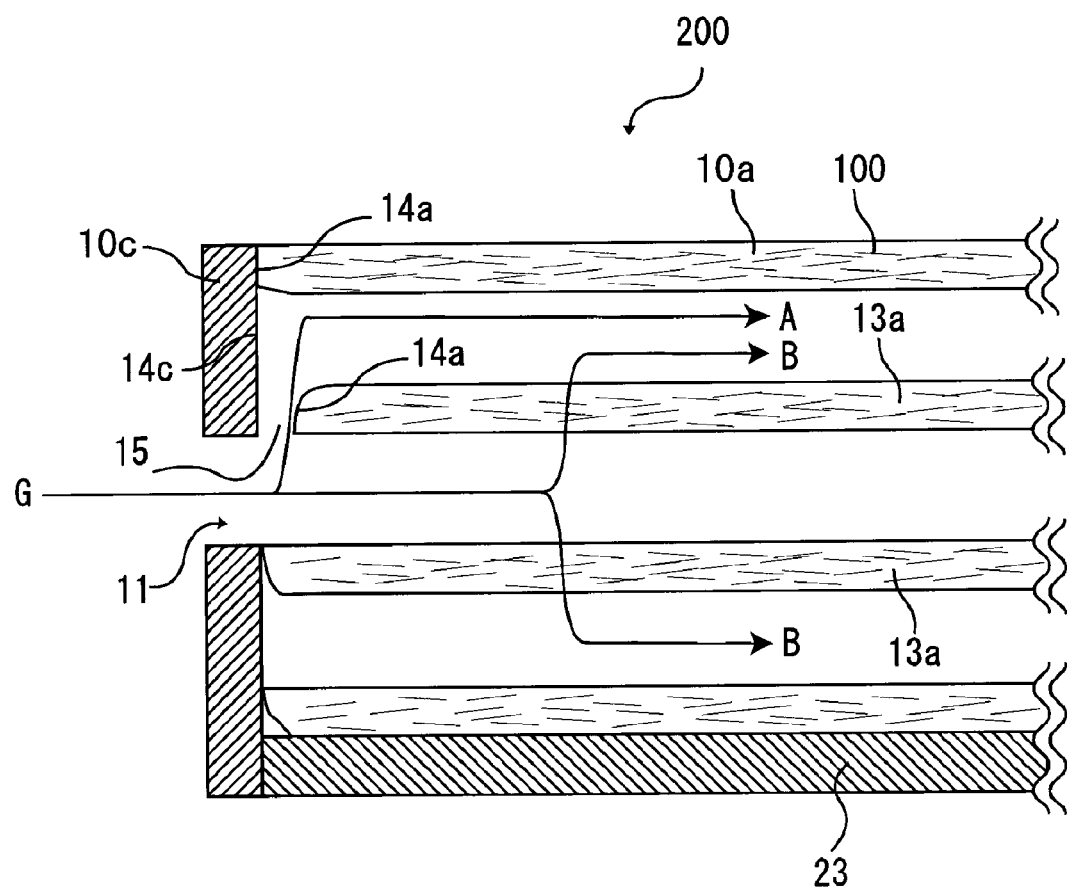
FIG. 2 is an enlarged cross-sectional view schematically showing an end face neighborhood of the honeycomb filter shown in FIG. 1B when cut in the direction parallel with the longitudinal direction thereof.

FIG. 2 is an enlarged cross-sectional view schematically showing an end face neighborhood of the honeycomb filter shown in FIG. 1B when cut in the direction parallel with the longitudinal direction thereof.

Observation on an end face 14*a* of the honeycomb structure 10*a* clarified that the end face 14*a* of the honeycomb structure 10*a* was not an even surface, but a surface with irregularities. Further, an end face 14*c* of the end member 10*c* was virtually even surface.

Here, as shown in FIG. 2, an observation on the end face neighborhood of the honeycomb filter 200 clarified that a gap 15 was formed between the end face 14*a* of the honeycomb structure 10*a* and the end face 14*c* of the end member 10*c* because of the irregularities on the end face 14*a* of the honeycomb structure 10*a*.

It was conceivable that the gap 15 might cause a case where exhaust gases G flowing into the honeycomb filter 200 from a through hole 11 (exhaust gas inlet side through hole) having an opening at one end face of the honeycomb filter follow a route to pass through the gap 15 as indicated by an arrow A in FIG. 2, instead of a route to pass through the wall portion 13*a*, which the exhaust gases are supposed to flow (route indicated by an arrow B).

The exhaust gases G following the route to pass through the gap 15 as indicated by the arrow A was conceivable to flow out of the honeycomb filter 200 from a through hole (exhaust gas outlet side through hole) having an opening at the other end face of the honeycomb filter without passing through the wall portion 13*a*, and this was thought to be a cause of reduction in capturing efficiency of PM.

According to the embodiment of the present invention, it is possible to provide a honeycomb filter having a low pressure loss and a high capture efficiency of PM.

Figure 3:
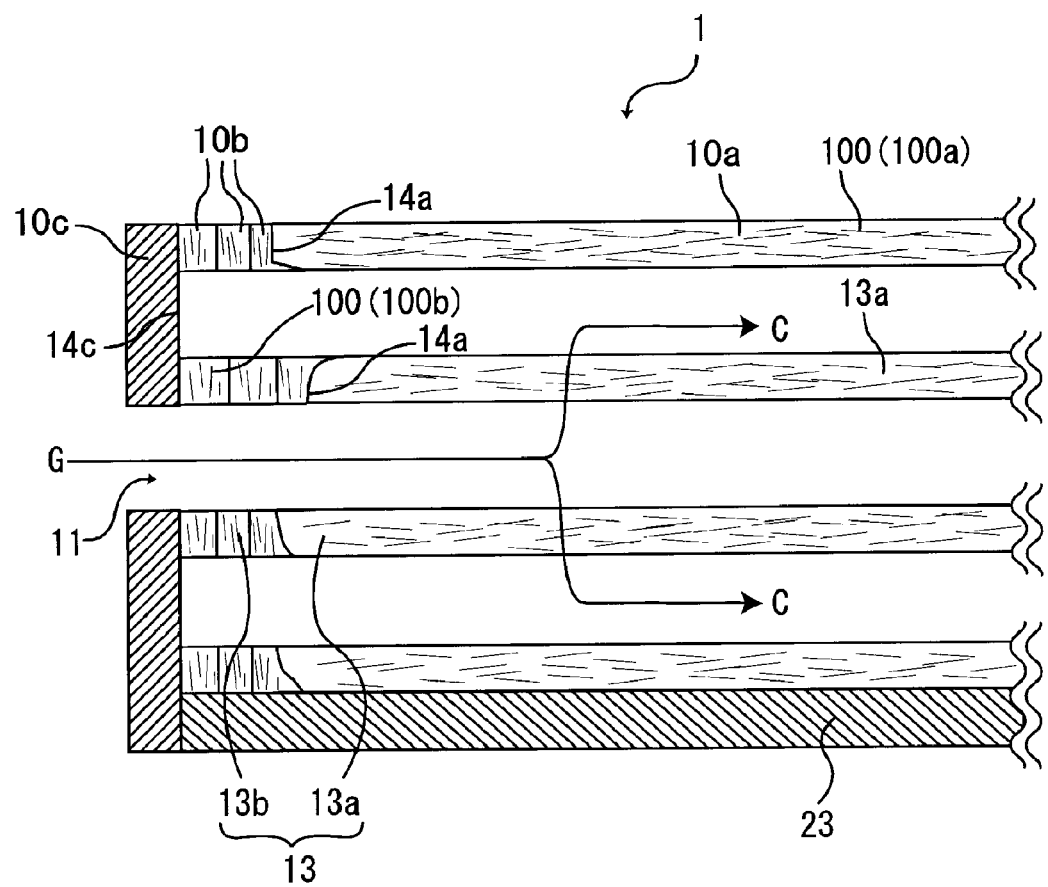
FIG. 3 is an enlarged cross-sectional view schematically showing an end face neighborhood of one example of the honeycomb filter according to one embodiment of the present invention when cut parallel with the longitudinal direction thereof.

FIG. 3 is an enlarged cross-sectional view schematically showing an end face neighborhood of one example of the honeycomb filter according to one embodiment of the present invention when cut parallel with the longitudinal direction thereof.

In the honeycomb filter shown in FIG. 3, the honeycomb structure 10*a* is installed in a metal casing 23 and the end members 10*c* are fixed to the both end portions of the metal casing 23, and moreover, lamination members 10*b* are laminated on the both end faces of the honeycomb structure 10*a*, that is, between the honeycomb structure 10*a* and the end members 10*c*.

The honeycomb structure 10*a* includes inorganic fibers as a main constituent material and the inorganic fibers 100 (100*a*) are oriented more along the forming direction of the through holes 11*a*.

The honeycomb structure 10*a* of this kind is, when pressure is applied in the forming direction of the through holes 11*a*, less likely to shrink in the pressure direction, and tends to have a weak restoring force to restore to the original shape.

The lamination members 10*b* include inorganic fibers as a main constituent material and the inorganic fibers 100 (100*b*) are oriented more along the direction perpendicular to the forming direction of the through holes 11*b*.

The lamination members 10*b* of this kind are, when pressure is applied in the forming direction of the through holes 11*b*, likely to shrink in the pressure direction, and tends to have a strong restoring force to restore to the original shape.

Accordingly, when pressure is applied in the forming direction of the through holes 11, the lamination members 10b have greater elasticity in the forming direction of the through holes 11 of the honeycomb filter 1, compared to the honeycomb structure 10a.

In a honeycomb filter 1 including: the honeycomb structure 10a installed in the metal casing 23; the end members 10c fixed to the both end portions of the metal casing 23; and the lamination members 10b laminated between the honeycomb structure 10a and the end members 10c, the honeycomb structure 10a is less likely to shrink in the forming direction of the through holes and the lamination members 10b tend to be in the state deformed in accordance with the shapes of irregularities on the end face 14a of the honeycomb structure 10a and the shape of the end face 14c of the end member 10c because of its great elasticity as above described.

Namely, the lamination members 10b tend to be made in close contact with the end face 14a of the honeycomb structure 10a and with the end face 14c of the end member 10c by being laminated between the honeycomb structure 10a and the end member 10c, thereby functioning to fill the gap generated between the honeycomb structure 10a and the end member 10c.

As above described, in the honeycomb filter 1 in which the lamination members 10b are made in close contact with the honeycomb structure 10a and with the end member 10c respectively, each constituent member may be laminated more easily so as to avoid a gap between each of the constituent members. Consequently, exhaust gases G flowing into the honeycomb filter 1 from one through hole 11 are allowed to flow out of the honeycomb filter 1 from another through hole 11 after passing through the wall portion 13 (the wall portion 13a of the honeycomb structure 10a or a wall portions 13b of the lamination members 10b), tending not to flow into a gap between each of the constituent members. As a result, PM in the exhaust gases G is captured by the wall portion 13 and the honeycomb filter 1 tends to have a high capture efficiency of PM.

In the honeycomb filter according to the embodiments of the present invention, the lamination member laminated on the end faces of the honeycomb structure has an entire length in the forming direction of the through holes of the lamination member, respectively on one end face side and on the other end face side, in the range of at least about 1% and at most about 10% of the length of the honeycomb structure in the forming direction of the through holes of the honeycomb structure.

When the lamination member has the entire length of about 1% or more of the length of the honeycomb structure in the forming direction of the through holes of the honeycomb structure respectively on one end face side and on the other end face side, the lamination member tends to be in the state deformed sufficiently in accordance with the shapes of irregularities on the end face of the honeycomb structure and the shape of the end face of the end member.

Consequently, in the honeycomb filter according to the embodiments of the present invention, the honeycomb structure tends to be made in close contact with the lamination member and the lamination member tends to be made in close contact with the end member.

Accordingly, in the honeycomb filter according to the embodiments of the present invention, exhaust gases are less likely to flow into a gap between each of the constituent members, and the honeycomb filter tends to have a high capture efficiency of PM.

Further, when the lamination member has the entire length of about 10% or less of the entire length of the honeycomb structure in the forming direction of the through holes of the honeycomb structure respectively on one end face side and on the other end face side, in a case where a plurality of the lamination members each having the same length in the forming direction of through holes are laminated, the number of lamination members forming the honeycomb filter is more likely to be reduced, and therefore, the number of lamination interface in which inorganic fibers are densely distributed can be further reduced. Accordingly, the honeycomb filter tends to have a further low pressure loss.

In the honeycomb filter according to the embodiments of the present invention, either one end portion of each of through holes is sealed by the end member, the through holes being formed by the through holes of the honeycomb structure and the through holes of the lamination member superposed on one another so as to communicate with each other.

In the honeycomb filter according to the embodiments of the present invention, either one end portion of the through hole formed by the through hole of the honeycomb structure and the through hole of the lamination member communicating with each other is sealed by the end member. Therefore, PM in exhaust gases may be captured more easily by the wall portion of the honeycomb structure and the wall portion of the lamination member.

In the honeycomb filter according to the embodiments of the present invention, either one end portion of each of the through holes of the honeycomb structure is sealed by the end member and the lamination member.

In the honeycomb filter according to the embodiments of the present invention, since either one end portion of each of the through holes of the honeycomb structure is sealed by the lamination member and the end member, the end portions of the through holes of the honeycomb structure tend to be more surely sealed.

In the honeycomb filter according to the embodiments of the present invention, the end member is fixed to the metal casing by at least one of welding and a screw.

In the honeycomb filter according to the embodiments of the present invention, since the metal casing and the end member are fixed firmly, a strong pressure is applied in the forming direction of the through holes of the lamination members and the lamination member becomes likely to deform because of its elasticity. As a result, the constituent members tend to be made in closer contact with each other.

In the honeycomb filter according to the embodiments of the present invention, a catalyst is supported on the honeycomb filter.

In the honeycomb filter according to the embodiments of the present invention, since a catalyst is supported on the honeycomb filter, contact between the catalyst and PM captured by the honeycomb filter makes it possible to reduce activation energy required for burning PM in a regenerating treatment of the honeycomb filter. Therefore, it is possible for PM to be burned more efficiently at lower temperature. Further, it is also possible for the honeycomb filter with the catalyst supported thereon to function as a catalyst converter for converting CO, HC, NOx, and the like in exhaust gases or generated during the burning of PM.

First Embodiment

The following will discuss a first embodiment which is one embodiment of the present invention with reference to FIGS. 4 and 5.

Figure 4A:
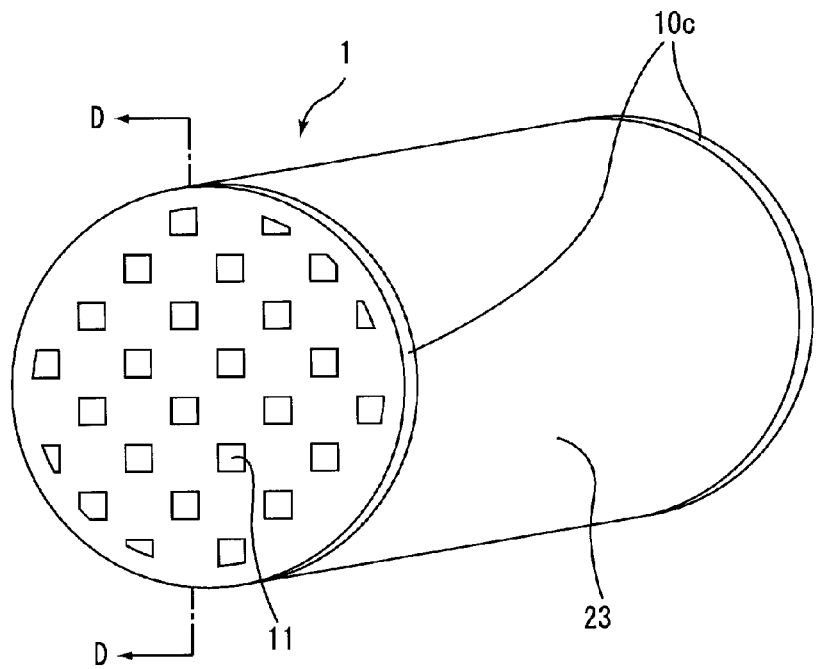
FIG. 4A is a perspective view schematically showing one example of the honeycomb filter according to one embodiment of the present invention.
Figure 4B:
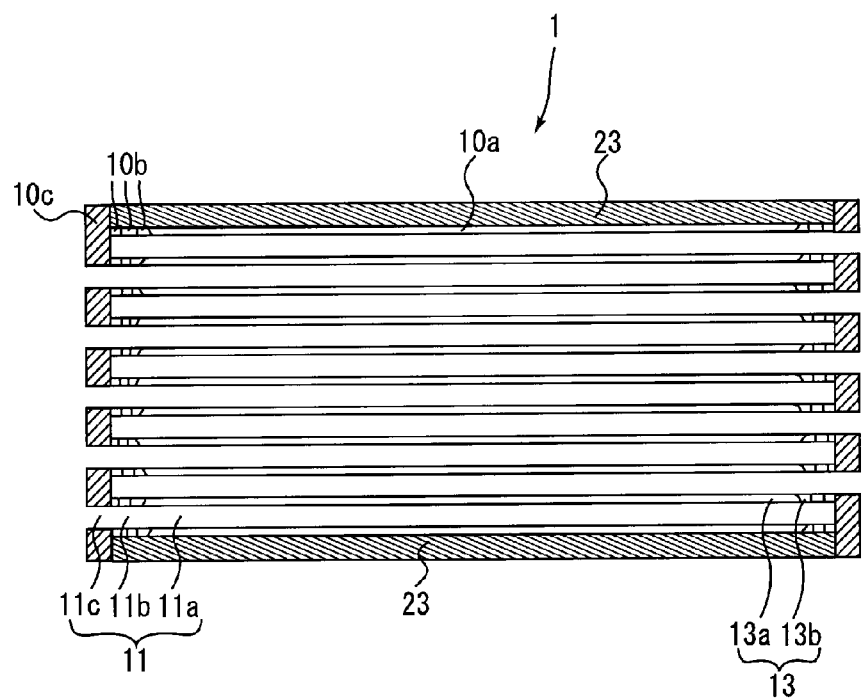
FIG. 4B is a D-D line cross-sectional view of the honeycomb filter shown in FIG. 4A.

FIG. 4A is a perspective view schematically showing one example of a honeycomb filter according to one embodiment of the present invention, and FIG. 4B is a D-D line cross-sectional view of the honeycomb filter shown in FIG. 4A.

Figures 5A, 5B:
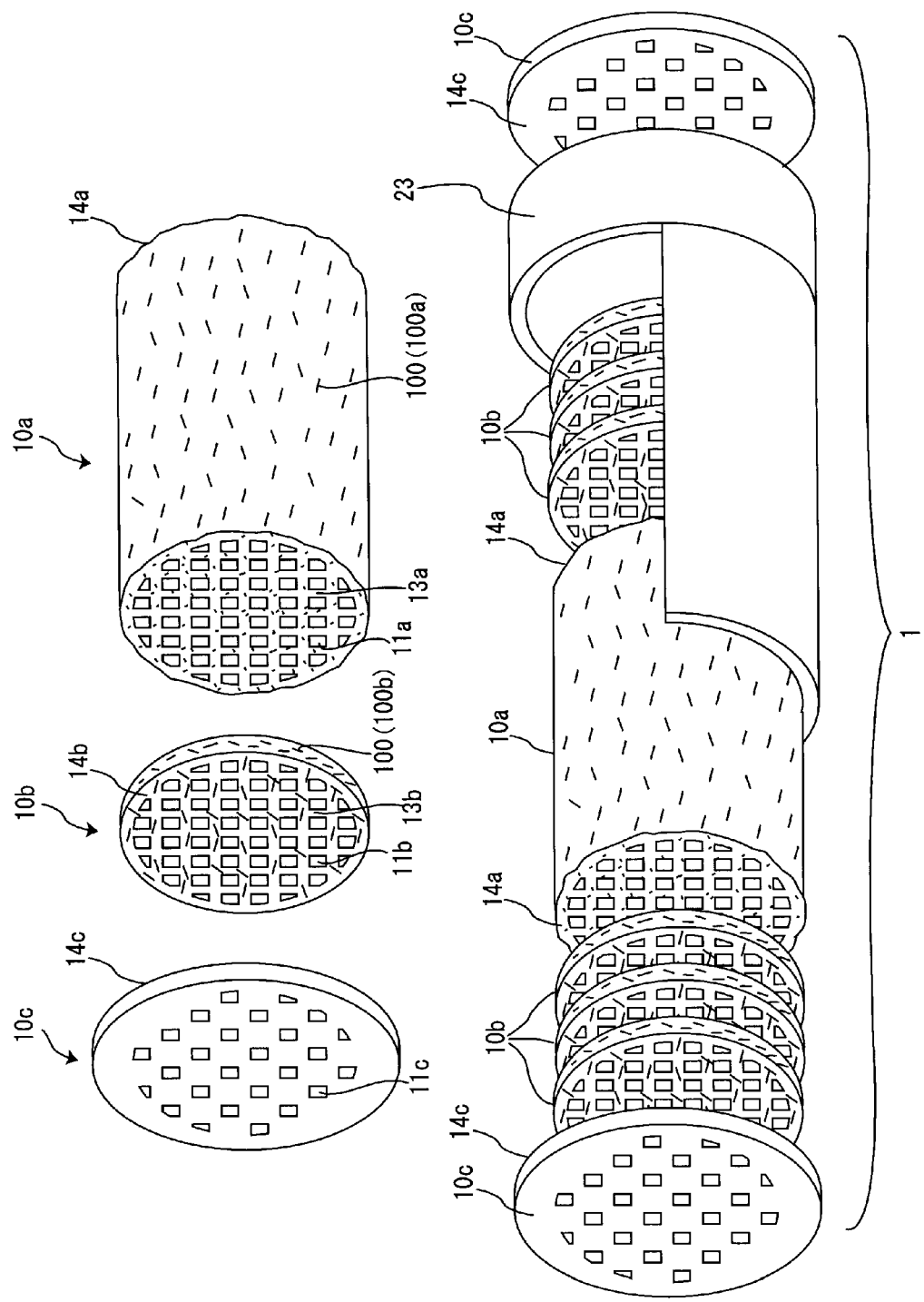
FIG. 5A is a perspective view schematically showing one example of each of a honeycomb structure, a lamination member, and an end member, which form the honeycomb filter according to one embodiment of the present invention.
FIG. 5B is a perspective view schematically showing a state of manufacturing a honeycomb filter by using the honeycomb structure, the lamination member, and the end member shown in FIG. 5A.

FIG. 5A is a perspective view schematically showing one example of a honeycomb structure, a lamination member, and an end member, which form the honeycomb filter according to one embodiment of the present invention. FIG. 5B is a perspective view schematically showing a state of manufacturing a honeycomb filter by using the honeycomb structure, the lamination member, and the end member shown in FIG. 5A.

As shown in FIG. 4A, the honeycomb filter 1 has a round pillar-shape and a side face thereof is formed by the metal casing 23, and further, an end face thereof is formed by the end member 10c.

Further, inside the metal casing 23, the honeycomb structure 10a and the lamination members 10b located at the both ends of the honeycomb structure 10a are placed as shown in FIG. 4B and FIG. 5B.

As shown in FIG. 4B, the honeycomb filter 1 has the through holes 11 formed by through holes 11c of the end member 10c, through holes 11b of the lamination member 10b, and through holes 11a of the honeycomb structure 10a, which are communicating with each other, and one end portion of each of the through holes 11 is sealed by the end member 10c.

Moreover, the wall portion 13 including the wall portion 13b of the lamination members 10b and the wall portion 13a of the honeycomb structure 10a are formed, and each of the through holes 11 is separated by the wall portion 13.

Thus, exhaust gases flowing in through one through hole 11 are allowed to flow out from another through hole 11 after surely passing through the wall portion 13 separating the through hole 11. Accordingly, PM is captured inside the wall portion 13 when exhaust gases pass through the wall portion 13, and exhaust gases are purified.

Following will specifically discuss each constituent member forming the honeycomb filter 1.

First, there will be described the honeycomb structure 10a. As shown in FIG. 5A, the honeycomb structure 10a is integrally molded as a structured body mainly including inorganic fibers 100 (100a), and has a round pillar-shape. Inside thereof are provided a large number of through holes 11a each penetrating from one end face to the other end face in the direction parallel with the longitudinal direction of the honeycomb structure 10a and separated by the wall portion 13a. Further, inorganic fibers 100 (100a) forming the honeycomb structure 10a are oriented more along the forming direction of the through holes 11a.

Here, there is described the orientation of the inorganic fibers with reference to the drawings.

Figure 6A:
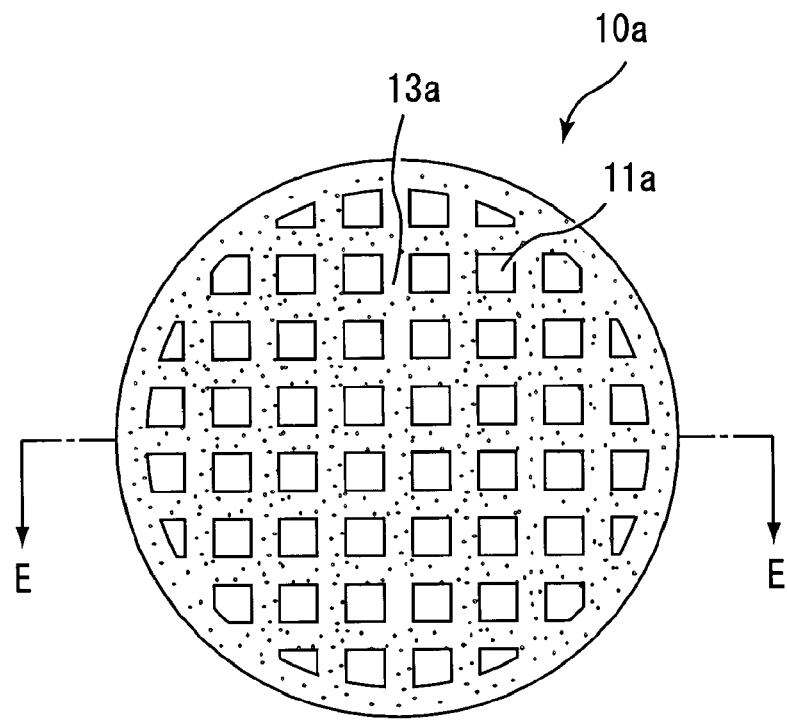
FIG. 6A is a front view of the honeycomb structure shown in FIG. 5A.
Figure 6B:
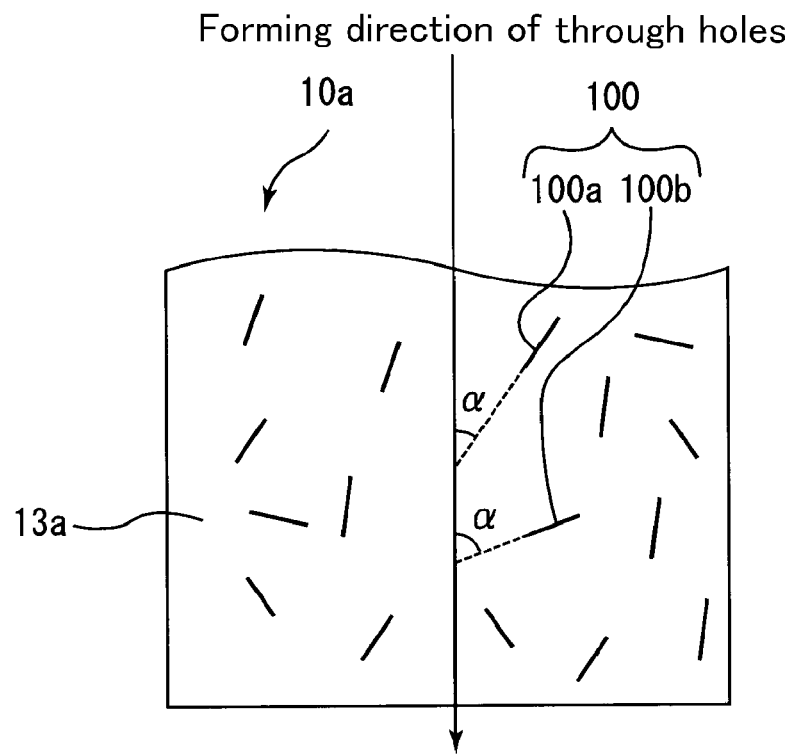
FIG. 6B is an E-E line cross-sectional view of the honeycomb structure shown in FIG. 6A.

FIG. 6A is a front view of the honeycomb structure shown in FIG. 5A, and FIG. 6B is an E-E line cross-sectional view of the honeycomb structure shown in FIG. 6A.

As shown in FIG. 6B, when observing the E-E line cut-out section of the honeycomb structure 10a shown in FIG. 6A cut along the wall portion 13a, out of the inorganic fibers 100, inorganic fibers 100a oriented so that an angle α between the forming direction of the through holes 11a and the fibrous direction of the inorganic fibers is in the range of 0° to 45° are defined as inorganic fibers oriented along the forming direction of the through holes, and inorganic fibers 100b oriented so that the above angle α is in the range of 45° to 90° are defined as inorganic fibers oriented along the direction perpendicular to the forming direction of the through holes. Here, a state in which inorganic fibers are oriented more along the forming direction of the through holes means that there are more inorganic fibers 100a oriented along the forming direction of the through holes than the inorganic fibers 100b oriented along the direction perpendicular to the forming direction of the through holes.

Further, the orientation of the inorganic fibers on the cut-out section of the honeycomb structure can be determined by using scanning electron microscope (SEM) and the like.

Furthermore, the honeycomb structure 10a mainly includes inorganic fibers. However, the honeycomb structure 10a further includes an inorganic material in addition to the inorganic fibers, and the shape of the honeycomb structure is maintained by fixing and adhering the inorganic fibers one another by interposing the inorganic material.

Next, there will be described the lamination members 10b. As shown in FIG. 5A, the lamination member 10b is a sheet-shaped member in a disc shape mainly including inorganic fibers, and the diameter thereof is virtually same as the diameter of the end face 14a of the round pillar-shaped honeycomb structure 10a. Further, the lamination members 10b have a large number of the through holes 11b each separated by the wall portion 13b, which penetrate from one end face to the other end face of the lamination members 10b.

Further, the inorganic fibers 100 forming the lamination members 10b are oriented more along the direction perpendicular to the forming direction of the through holes 11b.

Moreover, a method for determining an orientation of inorganic fibers in the lamination members 10b is as same as the above described method for determining the orientation of the inorganic fibers in the honeycomb structure 10a. Namely, a state in which inorganic fibers are oriented more along the direction perpendicular to the forming direction of the through holes means that there are more inorganic fibers 100b oriented along the direction perpendicular to the forming direction of the through holes than the inorganic fibers 100a oriented along the forming direction of the through holes.

Furthermore, each of the lamination members 10b mainly includes inorganic fibers. However, each of the lamination members 10b further includes an inorganic material in addition to the inorganic fibers, and the shape of the lamination members is maintained by fixing and adhering the inorganic fibers one another by interposing this inorganic material.

Next, there will be described the metal casing 23. The metal casing 23 mainly includes a metal, and its shape is a round pillar-shape as shown in FIG. 5B. The inside diameter thereof is virtually same as the diameter of the end face 14a of the honeycomb structure 10a and end faces 14b of the lamination members 10b, and the length thereof is virtually same as the length of the honeycomb structure 10a in the longitudinal direction. Here, FIG. 5B is a drawing that illustrates the metal casing 23 with the upper portion of its cylindrical portion forming the metal casing 23 omitted.

Next, there will be described the end member 10c. The end member 10c mainly includes a metal and its shape is a disk shape as shown in FIG. 5A. Further, the diameter of its end face 14c is virtually same as the external diameter of the metal casing 23. Furthermore, the through holes 11c penetrating from one end face to the other end face of the end member 10c are formed in a checkered pattern.

Following will discuss the structure of the honeycomb filter formed by each of the above described constituent members, with reference to FIG. 5B.

As shown in FIG. 5B, in the honeycomb filter 1, three lamination members 10b are respectively laminated on each end face 14a of the honeycomb structure 10a in the metal casing 23.

Here, the honeycomb structure 10a and all the lamination members 10b are laminated so that locations of respective through holes are superposed on one another. Namely, the through holes 11a of the honeycomb structure 10a and the through holes 11b of six lamination members 10b are all superposed on one another so as to communicate with each other.

In the honeycomb filter 1, one end member 10c is placed on each outside of the outermost lamination members 10b. The end face 14c of the end member 10c and an end portion of the metal casing 23 is fixed by welding.

The end member 10c having the through holes 11c formed in a checkered pattern is fixed in such a manner that the through holes 11c and the through holes 11b of the lamination members 10b are superposed on one another and the through holes 11c of each of the end members 10c respectively on the both ends of the honeycomb filter 1 are not superposed on one another. By fixing the end members 10c in this position, one end portion of each of through holes formed by through holes of the honeycomb structure 10a and of the lamination members 10b communicating with each other is sealed.

Accordingly, through holes 11 of the honeycomb filter 1 are sealed alternately, that is, adjacent through holes are respectively sealed at different end portions.

Following will discuss a method for manufacturing the honeycomb filter 1 of the present embodiment.

(1) Process for Manufacturing Honeycomb Structure

First, alumina fibers, glass fibers, an organic binder, a plasticizer, a lubricant, and water are mixed, and sufficiently stirred to prepare a mixture.

Next, the mixture is charged into a cylinder from a mixture tank of a plunger-type extrusion-molding machine, and the piston is pressed toward a round pillar-shaped die side so that the mixture is extruded through the round pillar-shaped die to manufacture a round pillar-shaped elongated honeycomb molded body with a plurality of through holes longitudinally placed in parallel with one another with a wall portion therebetween.

Subsequently, the elongated honeycomb molded body is cut into a predetermined length by using a cutting apparatus having a cutting disc as its cutting member, and thereafter, the resulting honeycomb molded body is dried at the temperature of at least about 100° C. and at most about 200° C. for at least about 5 minutes and at most about 60 minutes under normal atmosphere by using a microwave drying apparatus and a hot-air drying apparatus.

Next, the dried honeycomb molded body is degreased in a degreasing furnace at the temperature of at least about 200° C. and at most about 600° C. for at least about 1 hour and at most about 5 hours under normal atmosphere, and then, fired in a firing furnace at the temperature of at least about 900° C. and at most about 1050° C.

Further, the resulting honeycomb molded body is immersed into a hydrochloric acid solution of at least about 1 mol/l and at most about 10 mol/l for at least about 0.5 hours and at most about 24 hours so that an acid treatment is carried out thereon, and this is again fired at the temperature of at least about 900° C. and at most about 1050° C. to manufacture a honeycomb structure 10a.

The honeycomb structure manufactured in this manner becomes a honeycomb structure in which inorganic fibers are oriented more along the forming direction of through holes.

(2) Process for Manufacturing Lamination Member

First, alumina fibers are dispersed in a sufficient amount of water, and in addition, an inorganic binder and an organic binder are added. Further, small amounts of a coagulant and a flocculant are added, and sufficiently stirred to prepare a sheet-forming slurry.

The sheet-forming slurry obtained in the above process is subjected to a sheet forming process by using a round-shaped mesh, and the resulting precursors of the lamination members are dried at the temperature of at least about 100° C. and at most about 200° C. Thus, a sheet-shaped lamination member having a large number of through holes penetrating from one face to the other face of the lamination member and each separated by a wall portion, can be obtained.

(3) Process for Manufacturing End Member

A laser machining is carried out on a virtually disk-shaped porous metal plate mainly including a metal such as stainless steel so that an end member with through holes formed in a checkered pattern as shown in FIG. 5A is manufactured.

(4) Lamination Process

First, one end member is placed to one end portion of the metal casing with its end face adjusted thereto and fixed by welding.

Next, this metal casing is raised so that the end face with the end member fixed is at the bottom. Then, three lamination members are laminated in the metal casing, in such a manner that through holes of this end member and through holes of the lamination members are superposed on one another and through holes of respective lamination members are superposed on one another.

Subsequently, a honeycomb structure is laminated in the metal casing in such a manner that through holes of the honeycomb structure and the through holes of the lamination members are superposed on one another.

Further, three lamination members are laminated on the exposed upper end face of this honeycomb structure so that the through holes of the honeycomb structure and the through holes of the lamination members are superposed on one another and the through holes of respective lamination members are superposed on one another.

Thereafter, an end member is laminated on the end face of the lamination members so that the through holes of the end member and the through holes (the through holes are not overlapping with the through holes of the end member on the bottom side) of the lamination members are superposed on one another.

(5) Pressing Process

In a state where respective constituent members are laminated, the end member in the uppermost position is located above the end portion of the metal casing. Here, pressure is applied to the upper surface of the end member in a downward direction, that is, in a direction parallel with the forming direction of the through holes. Then, the lamination members are deformed because of the elasticity thereof so that the end member moves downward until the end member comes in contact with the metal casing. In this pressing process, pressure is reduced when the end member comes in contact with the metal casing after moving downward, so that the end member does not move from the position.

(6) Fixing Process

In a state where the end member and the metal casing are in contact with each other, the end member and the end portion of the metal casing are fixed by welding. By the above processes, a round pillar-shaped honeycomb filter is manufactured.

In the following, effects of the honeycomb filter of the first embodiment will be listed.

(1) A honeycomb filter is formed by an integrally formed honeycomb structure in a pillar shape, which mainly includes inorganic fibers. Since the integrally formed honeycomb structure does not have a lamination interface, that is, a part in which inorganic fibers are comparatively densely distributed, the honeycomb filter tends to have a low pressure loss.

(2) Since inorganic fibers forming the lamination member are oriented more along the direction perpendicular to the forming direction of the through holes, the lamination member tends to have a high restoring force (elasticity) to restore to the original shape, when pressure is applied in the forming direction of the through holes.

Further, inorganic fibers in the honeycomb structure are oriented more along the forming direction of the through holes, and the honeycomb structure is less likely to shrink when pressure is applied in the forming direction of the through holes, and tends to have a low restoring force (elasticity).

Furthermore, the end member hardly shrinks due to the pressure and does not have a restoring force (elasticity).

In the honeycomb filter of the present embodiment, the lamination member having high elasticity are laminated between the honeycomb structure and the end member each having low elasticity, and therefore, the lamination member tends to be in the state deformed in accordance with the shape of irregularities on the honeycomb structure and the shape of the end face of the end member. Hence, since the lamination member tends to be made in close contact with the honeycomb structure and with the end member, exhaust gases flowing into the honeycomb filter tend not to flow into a gap between each constituent member. Accordingly, the honeycomb filter tends to have a high PM capture efficiency.

(3) Further, in the honeycomb filter of the present embodiment, end members are disposed on both end portions thereof and either one ends of the through holes formed by the through holes of the honeycomb structure and the through holes of the lamination member communicating with each other are sealed by the end members.

Therefore, it is possible for PM in exhaust gases to be captured by the wall portion of the honeycomb structure and the wall portion of the lamination members, and the honeycomb filter of the present embodiment tends to have a high capture efficiency of PM.

The following description will discuss the first embodiment of the present invention in more detail by Examples; however, the present invention is not limited only to these Examples.

Example 1

(1) Manufacturing of Honeycomb Structure (1-1) Mixing Process

First, 12.3 parts by weight of alumina fibers (average fiber length: 0.3 mm, average fiber diameter: 5 μm) including 72% of alumina and 28% of silica, 6.2 parts by weight of glass fibers (average fiber diameter: 9 μm, average fiber length: 3 mm), 11.7 parts by weight of an organic binder (methyl cellulose), 7.1 parts by weight of a pore-forming agent (acrylic resin), 8.1 parts by weight of a plasticizer (UNILUB, made by NOF Corporation), 3.8 parts by weight of a lubricant (glycerin) and 50.9 parts by weight of water were mixed, and sufficiently stirred to prepare a mixture.

(1-2) Extrusion-Molding Process

The mixture, obtained in process (1-1), was charged into a cylinder from a mixture tank of a plunger-type extrusion-molding machine, and the piston is pressed toward the die side so that the mixture was extruded through the die to manufacture an elongated round pillar-shaped honeycomb molded body with through holes.

(1-3) Cutting Process

The elongated round pillar-shaped honeycomb molded body, obtained in process (1-2), was cut by using a cutting apparatus having a cutting disc as its cutting member. Thus, a honeycomb molded body was obtained.

(1-4) Drying Process

The round pillar-shaped honeycomb molded body, obtained in process (1-3), was dried at 200° C. for three hours under normal atmosphere by using a microwave drying apparatus and a hot-air drying apparatus, so that moisture contained in the honeycomb molded body was removed.

(1-5) Degreasing Process

The round pillar-shaped honeycomb molded body, obtained in process (1-4), underwent a heating treatment at 400° C. for three hours in an electric furnace under normal atmosphere, so that organic substances contained in the honeycomb molded body were removed.

(1-6) Heating Treatment and Acid Treatment

The round pillar-shaped honeycomb molded body, obtained in process (1-5), underwent a heating treatment at 950° C. for five hours in a firing furnace under normal atmosphere.

Thereafter, the resulting honeycomb molded body was immersed into a HCl solution of 4 mol/l at 90° C. for one hour so that an acid treatment is carried out thereon, and this again underwent a heating treatment at 1050° C. for five hours to manufacture a honeycomb structure having a size of 160 mm in diameter, having a length of 58 mm in the forming direction of the through holes, and having through holes each having a size of 4.5 mm×4.5 mm and formed in a direction parallel with the longitudinal direction of the honeycomb structure.

Figure 7:
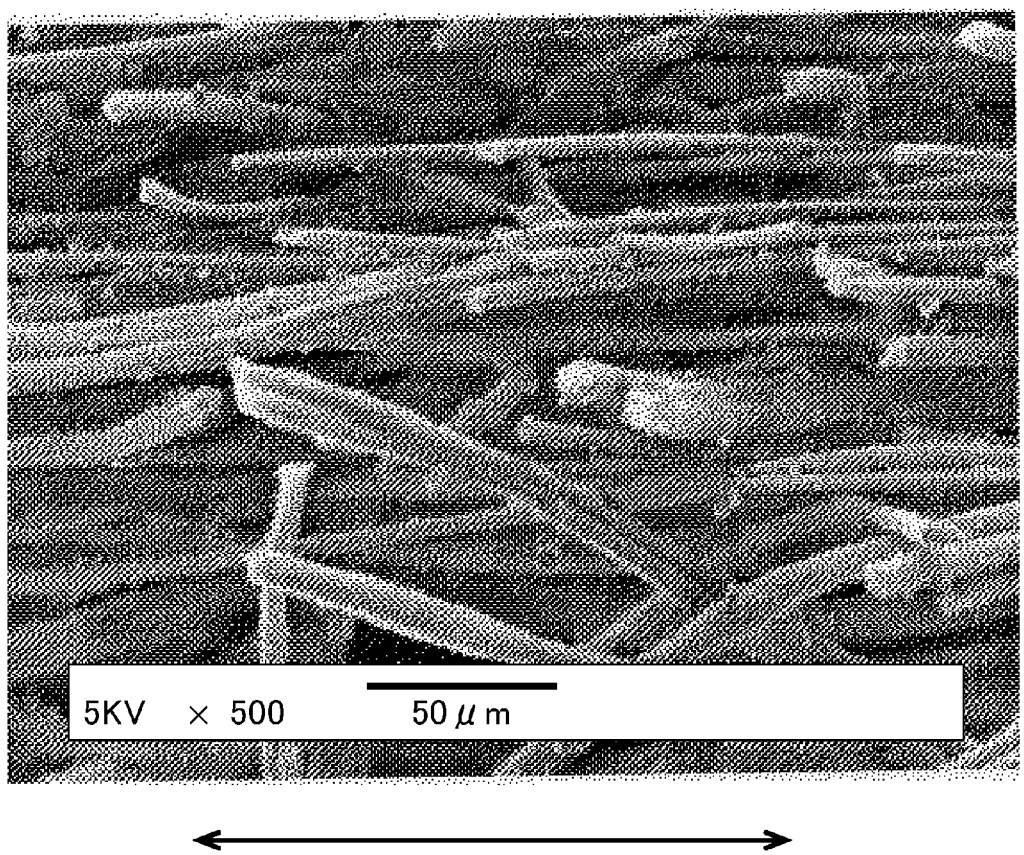
FIG. 7 is a SEM photo micrograph showing a state of the interior of the wall at 1.5 mm from the surface of the through hole of the honeycomb structure according to one embodiment of the present invention.

Here, orientation of the inorganic fibers in the honeycomb structure manufactured as described above was observed by using a scanning electron microscope (SEM), and the orientation of the inorganic fibers was determined, as shown in FIG. 7, that the inorganic fibers were oriented more along the forming direction of the through holes.

FIG. 7 is a SEM photo micrograph showing a state of the interior of the wall at 1.5 mm from the surface of the through hole of the honeycomb structure according to one embodiment of the present invention (Example 1).

(2) Manufacturing of Lamination Member (2-1) Preparation Process of Sheet-Forming Slurry Alumina fiber is dispersed at the rate of 10 g with respect to 1 liter of water, and in addition, 5 wt % of silica sol as an inorganic binder and 3 wt % of acrylic latex as an organic binder, with respect to the amount of the fiber, are added. Furthermore, slight amounts of aluminum sulfate as coagulant and polyacrylamide as a flocculant are added, and sufficiently stirred to prepare a sheet-forming slurry.

(2-2) Sheet-Forming Process

The sheet-forming slurry obtained in process (2-1) was formed into a sheet by using a mesh having a diameter of 160 mm, in which openings each having a size of 4.5 mm×4.5 mm are formed on virtually entire surface with mutual intervals of 2 mm, and the resulting sheet was dried at 150° C., so that a lamination member having a thickness of 1 mm with through holes, each having a size of 4.5 mm×4.5 mm and being formed on the entire surface with mutual intervals of 2 mm, was formed.

This lamination member was defined as a lamination member A.

Here, orientation of the inorganic fibers in the lamination member A manufactured as described above was observed by using a scanning electron microscope (SEM) to find that the inorganic fibers were oriented more along the direction perpendicular to the forming direction of the through holes.

(3) Manufacturing of End Member (3-1) Manufacturing Process of End Member

After a metal plate including Ni—Cr alloy had been machined into a disc shape having a size of 165 mm in diameter×1 mm in thickness, a laser machining is carried out on it so that an end member with through holes of 4.5 mm×4.5 mm formed in a checkered pattern was manufactured. Two end members were manufactured in this process, and through holes were formed on these end members at respectively different positions so that sealed portions were made different between the end face on the exhaust gas inlet side and the other end face on the exhaust gas outlet side of the honeycomb filter when the end members were laminated in the following lamination process.

(4) Manufacturing of Honeycomb Filter (4-1) Lamination Process

First, one end member obtained in the process (3) was placed on one end portion of a cylindrical casing (metal casing) having a size of 165 mm in external diameter (160 mm in internal diameter)×60 mm in length and fixed by welding. This casing was raised so that the end face with the end member fixed was at the bottom. Then, three lamination members A obtained in the process (2) were laminated in the casing, in such a manner that through holes of the end member and through holes of the lamination members were superposed on one another and through holes of respective lamination members were superposed on one another. Subsequently, a honeycomb structure manufactured in the process (1) was laminated in the casing in such a manner that through holes of the honeycomb structure and the through holes of the lamination members were superposed on one another. Further, three lamination members were laminated on the honeycomb structure in such a manner that the through holes of the honeycomb structure and the through holes of the lamination members were superposed on one another and the through holes of respective lamination members were superposed on one another.

Thereafter, another end member was laminated on the end portion of the lamination members so that the through holes thereof and the through holes of the lamination members were superposed on one another.

(4-2) Pressing Process and Fixing Process

Pressure was applied on this end member until the end member became in contact with the metal casing, and the end member was fixed to the end portion of the metal casing by welding so that the honeycomb structure and the lamination members were fixed in the metal casing. Thus, a honeycomb filter having a size of 165 mm in diameter×62 mm in length was manufactured.

Here, in this process, the end member was placed in such a manner that sealed positions were different between the end portion on the exhaust gas inlet side and the end portion on the exhaust gas outlet side (so that only either one end of superposed through holes are sealed).

Comparative Example 1

A honeycomb filter having a structure as shown in FIG. 10B was manufactured in the same manner as in Example 1, except that only the lamination members A manufactured in the process (2) were laminated in the metal casing without laminating a round pillar-shaped honeycomb structure. Here, 96 sheets of the lamination members A were laminated in total.

Comparative Example 2

A honeycomb filter having a structure as shown in FIG. 1B was manufactured in the same manner as in Example 1, except that only a honeycomb structure having a size of 160 mm in diameter and 60 mm in length in the forming direction of the through holes, manufactured in virtually same process as the process (1), was laminated in the metal casing without laminating a lamination member.

The pressure loss and the capture efficiency of PM were measured with respect to each of the honeycomb filters manufactured in respective Example and Comparative Examples, and the characteristics thereof were evaluated.

(Evaluation on Pressure Loss)

Figure 8:
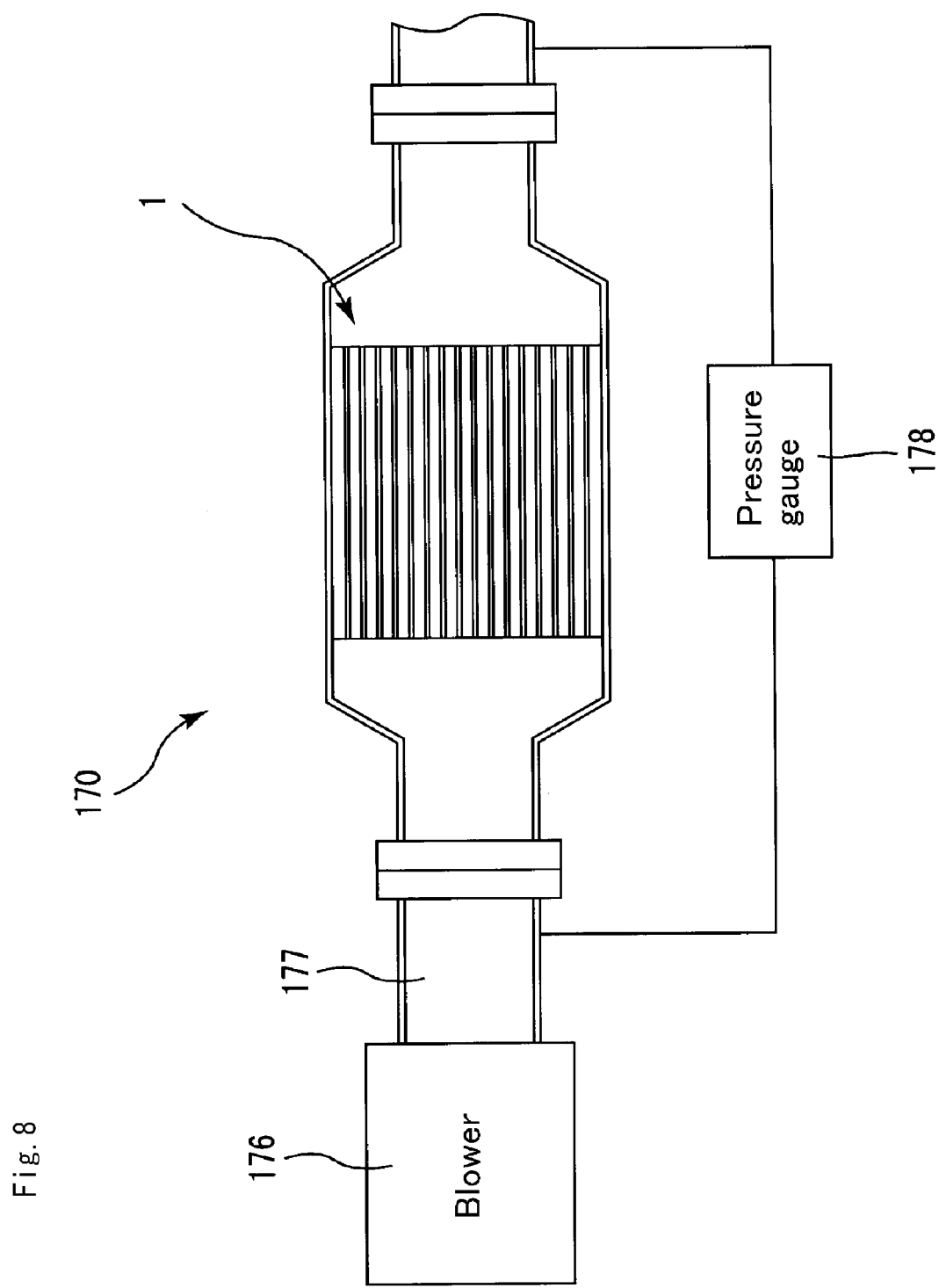
FIG. 8 is an explanatory view of a pressure loss measuring apparatus.

A pressure loss measuring apparatus 170 as shown in FIG. 8 was used for measurements on the pressure loss. FIG. 8 is an explanatory view of the pressure loss measuring apparatus.

This pressure loss measuring apparatus 170 has a structure in which a honeycomb filter 1 is fixed to be placed in an exhaust gas pipe 177 connected to a blower 176, and a pressure gauge 178 is attached so as to detect pressures before and after the honeycomb filter 1.

Here, the blower 176 was driven so that the flow rate of exhaust gases was set to 10 n/s, and after a lapse of 5 minutes from the start of the driving operation, a pressure difference (pressure loss) was measured.

As a result, pressure losses of the honeycomb filters manufactured in Example 1, Comparative Examples 1 and 2 were respectively 40 kPa, 47 kPa, and 38 kPa.

(Evaluation on Capture Efficiency of PM)

Figure 9:
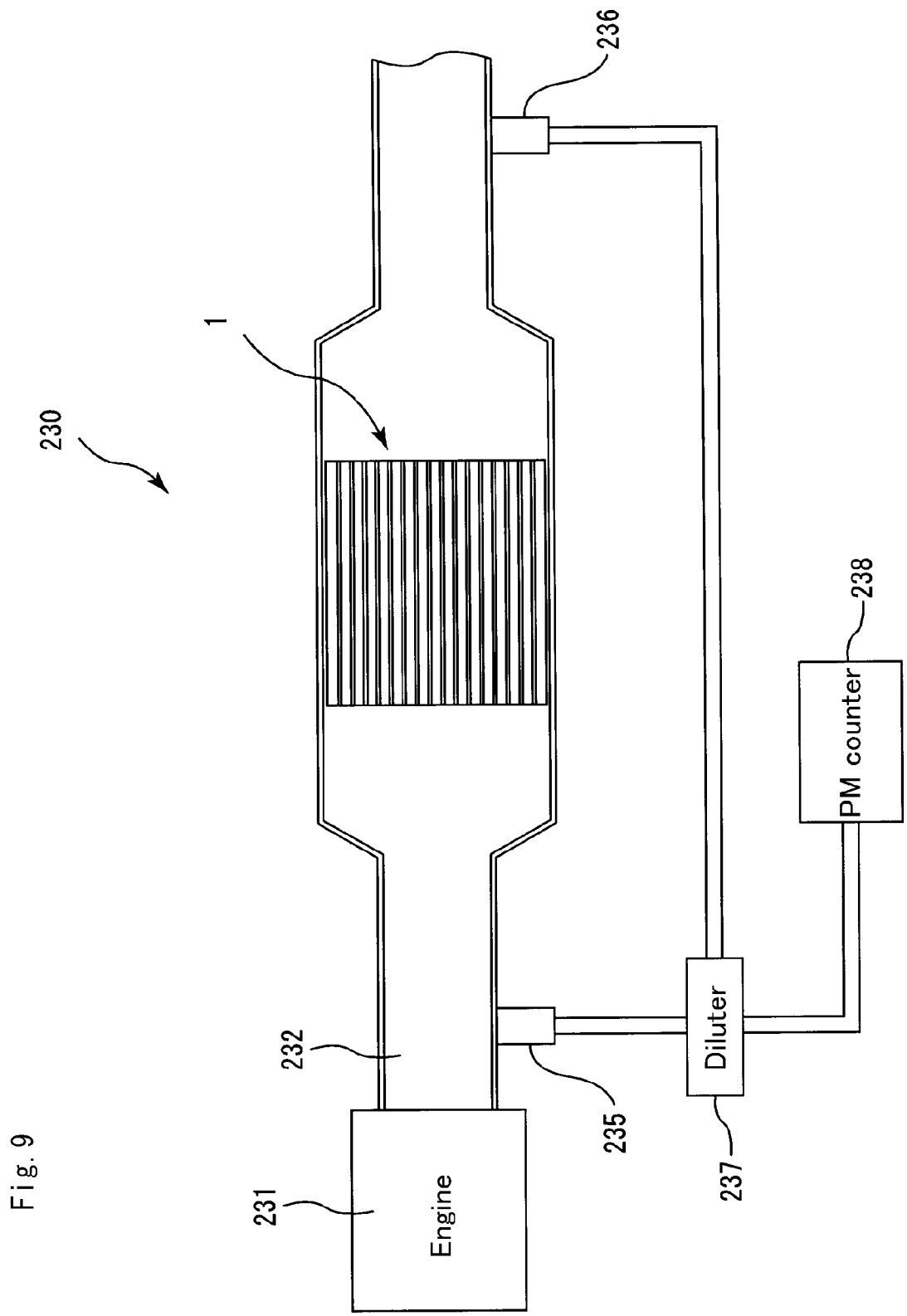
FIG. 9 is an explanatory view of the PM capture efficiency measuring apparatus.

Measurement of the capture efficiency of PM was carried out using a PM capture efficiency measuring apparatus 230 as shown in FIG. 9. FIG. 9 is an explanatory view of the PM capture efficiency measuring apparatus.

The PM capture efficiency measuring apparatus 230 was structured as a Scanning Mobility Particle Sizer (SMPS) provided with a 2 L (litter) common-rail-type diesel engine 231, an exhaust gas pipe 232 that allows exhaust gases from the engine 231 to flow therein, a sampler 235 that samples exhaust gases prior to flowing through the honeycomb filter 1, a sampler 236 that samples exhaust gases after flowing through the honeycomb filter 1, a diluter 237 for diluting the exhaust gases sampled by the samplers 235 and 236, and a PM counter 238 (made by TSI Inc., Condensation Particle Counter 3022A-S) that measures the amount of PM contained in the diluted exhaust gases.

Here, honeycomb filter 1 was fixed to be placed in the exhaust gas pipe 232.

Next, measuring procedures are described; the engine 231 was driven at the number of revolutions of 2000 min-1 with a torque of 47 Nm so that exhaust gases from the engine 231 were allowed to flow through the honeycomb filter 1. In this case, P0, the amount of PM prior to flowing through the honeycomb filter 1, and P1, the amount of PM after flowing through the honeycomb filter 1, were confirmed by using the PM counter 238. Then, the capture efficiency of PM was calculated using the following equation (1):

Capture efficiency of $PM(\%) = (P0-P1)/P0 \times 100$

As a result, capture efficiencies of the honeycomb filters manufactured in Example 1, Comparative Examples 1 and 2 were respectively 80%, 78%, and 65%.

These results show that the honeycomb filter of Example 1 has a low pressure loss and a high capture efficiency of PM.

On the other hand, the honeycomb filter of Comparative Example 1 has a high pressure loss.

Further, the honeycomb filter of Comparative Example 2 has a low capture efficiency of PM.

Second Embodiment

Next, the following will discuss a second embodiment which is one embodiment of the present invention.

In the present embodiment, the lamination member to be laminated on the end face of the honeycomb structure in the first embodiment has an entire length in the forming direction of the through holes thereof, respectively on one end face side and on the other end face side, in the range of at least about 1% and at most about 10% of the length of the honeycomb structure in the forming direction of the through holes thereof.

In the present embodiment too, the effects (1) to (3) explained in the first embodiment can be exerted.

Further, the following effects can be exerted.

(4) In the honeycomb filter of the present embodiment, the lamination member laminated on the end face of the honeycomb structure has the entire length of about 1% or more of the length of the honeycomb structure in the forming direction of the through holes thereof, respectively on one end face side and on the other end face side.

Therefore, the lamination member tends to be in the state deformed sufficiently in accordance with the shapes of irregularities on the end face of the honeycomb structure and the shape of the end face of the end member.

Consequently, in the honeycomb filter of the present embodiment, the honeycomb structure tends to be made in close contact with the lamination member, and the lamination member tends to be made in close contact with the end member.

Accordingly, in the honeycomb filter of the present embodiment, exhaust gases are less likely to flow into a gap between each of the constituent members, and the honeycomb filter tends to have a high capture efficiency of PM.

(5) Further, the lamination member has the entire length of about 10% or less of the length of the honeycomb structure in the forming direction of the through holes of the honeycomb structure respectively on one end face side and on the other end face side.

Therefore, in a case where a plurality of the lamination members each having the same length in the forming direction of the through holes are laminated, the number of lamination members forming the honeycomb filter can be reduced, and therefore, the number of lamination interface in which inorganic fibers are densely distributed tends to be further reduced.

Accordingly, the honeycomb filter tends to have a lower pressure loss.

The following description will discuss the second embodiment of the present invention in more detail by Examples; however, the present invention is not limited only to these Examples.

In respective Examples and Reference Examples, honeycomb filters were manufactured by changing the length (entire length in the forming direction of through holes) of the lamination member to be laminated on both end faces of the honeycomb structure, and characteristics thereof were evaluated.

Examples 2, 3, Reference Examples 1 to 4

First, a lamination member having length of 0.5 mm in a forming direction of through holes thereof was manufactured by changing the condition of sheet forming in the process (2) of the first embodiment.

This lamination member was defined as a lamination member B.

Honeycomb filters were manufactured in the same manner as in Example 1, except that the lamination members A or the lamination members B in number respectively shown in Table 1 were laminated on the left side end face or on the right side end face of the honeycomb structure, so that the ratio (%) ("Ratio of lamination member" in Table 1) of the entire length of the lamination members in the forming direction of the through holes thereof on one end face side with respect to the length of the honeycomb structure in the forming direction of the through holes thereof after being made into a honeycomb filter becomes values in Table 1. Then, the pressure loss and the capture efficiency of PM were measured with respect to each of the manufactured honeycomb filters. The results are shown in Table 1 with the result of Example 1, Comparative Examples 1 and 2.

TABLE 1

| | Number of lamination members | | | | Length of lamination member in honey comb filter (mm) (*1) | | Length of honey comb structure (mm) | Ratio of lamination member (%) (*2) | | Pressure loss (kPa) | Capture efficiency of PM (%) |
|---|---|---|---|---|---|---|---|---|---|---|---|
| | Left side end face | | Right side end face | | Left side end face | Right side end face | | Left side end face | Right side end face | | |
| | A | B | A | B | | | | | | | |
| Example 1 | 3 | NA | 3 | NA | 1.0 | 1.0 | 58.0 | 1.7 | 1.7 | 40 | 80 |
| Example 2 | 1 | NA | 1 | NA | 0.6 | 0.6 | 58.8 | 1.0 | 1.0 | 39 | 78 |
| Example 3 | 10 | NA | 10 | NA | 5.0 | 5.0 | 50.0 | 10.0 | 10.0 | 42 | 79 |
| Reference Example 1 | 1 | NA | NA | 1 | 0.6 | 0.3 | 59.1 | 1.0 | 0.5 | 39 | 76 |
| Reference Example 2 | NA | 1 | NA | 1 | 0.3 | 0.3 | 59.4 | 0.5 | 0.5 | 39 | 74 |

TABLE 1-continued

| | Number of lamination members | | | | Length of lamination member in honey comb filter (mm) (*1) | | Length of honey comb structure (mm) | Ratio of lamination member (%) (*2) | | Pressure loss (kPa) | Capture efficiency of PM (%) |
|---|---|---|---|---|---|---|---|---|---|---|---|
| | Left side end face | | Right side end face | | Left side end face | Right side end face | | Left side end face | Right side end face | | |
| | A | B | A | B | | | | | | | |
| Reference Example 3 | 10 | NA | 15 | NA | 4.8 | 7.2 | 48.0 | 10.0 | 15.0 | 43 | 78 |
| Reference Example 4 | 15 | NA | 15 | NA | 6.9 | 6.9 | 46.2 | 15.0 | 15.0 | 43 | 78 |
| Comparative Example 1 | 96 (Lamination member A) | | | | NA | | NA | NA | NA | 47 | 78 |
| Comparative Example 2 | NA | | | | NA | | 60.0 | NA | NA | 38 | 65 |

(*1) Entire length of the lamination members on each end face side of the honeycomb structure in the forming direction of the through holes thereof after being laminated on both end faces of honeycomb structure and made into a honeycomb filter.
(*2) Ratio of the entire length of the lamination members on each end face side of the honeycomb structure in the forming direction of the through holes thereof with respect to the length of the honeycomb structure in the forming direction of the through holes thereof after being made into a honeycomb filter.

As shown in Table 1, in each of the honeycomb filters manufactured in Examples 1 to 3, the pressure loss was extremely low and the capture efficiency of PM was extremely high.

On the other hand, in each of the honeycomb filters manufactured in Reference Examples 1 and 2, since the length of the lamination members laminated on one end face or both end faces was less than 1%, the capture efficiency of PM was slightly low.

Further, in each of the honeycomb filters manufactured in Reference Examples 3 and 4, since the length of the lamination members laminated on one end face or both end faces was more than 10%, the pressure loss was slightly high.

Third Embodiment

Next, the following will discuss a third embodiment which is one embodiment of the present invention.

In the present embodiment, either one end portion of the through holes of the honeycomb structure is sealed by the end member and the lamination member, different from the first embodiment in which either one end portion of the through holes formed by the through holes of the honeycomb structure and the through holes of the lamination member communicating with each other are sealed by the end member.

In the lamination member used in the present embodiment, through holes each having a virtually same shape as the through holes of the honeycomb structure, are formed in a checkered pattern, that is, in number almost half as many as the number of the through holes of the honeycomb structure. This is virtually same location as that of the through holes of the end member in the first embodiment.

In the method for manufacturing the honeycomb filter in the present embodiment, examples of a method for manufacturing a lamination member in this kind of shape include a method of carrying out the sheet forming process on a sheet forming slurry having the same composition as the sheet forming slurry used in the first embodiment, by using a mesh on which openings in a predetermined shape are formed in a checkered pattern, and the like.

Then, the honeycomb filter can be manufactured in the same manner as in the first embodiment, except that the lamination member manufactured by the above method or the like is placed in such a manner that the positions of through holes thereof fit with positions of the through holes of the end member.

In the present embodiment too, the effects (1) to (3) described in the first embodiment can be exerted.

Fourth Embodiment

Next, the following will discuss a fourth embodiment which is one embodiment of the present invention.

A honeycomb filter of the present embodiment has a structure in which a catalyst is supported on at least one member out of inorganic fibers forming a honeycomb structure and inorganic fibers forming a lamination member, in addition to the structure described in the first embodiment.

Examples of a method to support a catalyst on the inorganic fibers of the honeycomb structure include a method in which an oxide catalyst is supported on the inorganic fibers by immersing a honeycomb structure in a solution containing a reasonable amount of catalyst for about 5 minutes and heating the resulting honeycomb structure at about 500° C.

Further, examples of a method to support a catalyst on the inorganic fibers of the lamination member include a method in which inorganic fibers with a catalyst attached thereon are prepared by immersing inorganic fibers in inorganic oxide slurry containing a catalyst for about 5 minutes and heating the resulting inorganic fibers at about 500° C., and then, the lamination member is manufactured by using the obtained inorganic fibers.

In the present embodiment too, the effects (1) to (3) described in the first embodiment can be exerted.

Further, the following effect can be exerted.

(6) Since a catalyst is supported on the honeycomb filter of the present embodiment, contact between the catalyst and PM captured by the honeycomb filter makes it possible to reduce activation energy required for burning PM in a regenerating treatment of the honeycomb filter.

Therefore, it is possible for PM to be burned more efficiently at lower temperature.

Further, it is also possible for the honeycomb filter with the catalyst supported thereon to function as a catalyst converter for converting CO, HC, NOx and the like in exhaust gases or generated during the burning of PM.

Other Embodiments

Each of the cross-sectional shapes, which are perpendicular to the longitudinal direction, of the honeycomb structure, the lamination member, and the end member each forming the honeycomb filter according to the embodiments of the present invention, and the honeycomb filter according to the embodiments of the present invention is not particularly limited to a round shape, and various shapes such as a rectangular shape may be used; however, it is preferable to use a shape enclosed only by a curved line or by curved lines and straight lines.

In addition to a round shape, specific examples thereof include a cylindroid shape, an elongated round shape, a racetrack shape, a shape in which one portion of a simple closed curved line such as a cylindroid shape or an elongated round shape has a recess portion (concave shape), and the like.

With respect to the preferable aperture ratio of the honeycomb structure according to the embodiments of the present invention, a lower limit is about 30% and an upper limit is about 60%.

The aperture ratio of about 30% or more tends not to cause a high pressure loss when exhaust gases are allowed to flow in and out of the honeycomb filter, and the aperture ratio of about 60% or less tends not to cause a reduction in the strength of the honeycomb structure and the lamination member each forming the honeycomb filter.

The honeycomb structure according to the embodiments of the present invention mainly includes inorganic fibers, and is preferably formed by these inorganic fibers and an inorganic material.

With respect to the material for inorganic fibers, examples thereof include: oxide ceramics such as silica-alumina, mullite, alumina, silica, titania and zirconia; nitride ceramics such as silicon nitride and boron nitride; carbide ceramics such as silicon carbide; basalt, and the like.

Each of these may be used alone or two or more kinds of these may be used in combination.

Out of these, at least one kind selected from the group consisting of silicon carbide, alumina, basalt, silica, silica-alumina, titania and zirconia is preferably used.

Thus, the honeycomb structure using these materials exerts a superior heat resistance.

With respect to the inorganic material, for example, those materials which are melted at a temperature at which the inorganic fibers are not melted or sublimated may be used. Moreover, those materials which are melted at a temperature equal to the heat-resistant temperature of the inorganic fibers or less are preferably used as the inorganic material.

With respect to the inorganic material, those containing silica are preferably used, and specific examples thereof include inorganic glass such as silicate glass, silicate alkali glass, borosilicate glass, and the like.

Moreover, in the honeycomb structure, the inorganic material is preferably melted and solidified to fix the intersection between the inorganic fibers or the vicinity thereof.

By allowing the inorganic material to be melted and solidified to fix the inorganic fibers to one another, the bond strength between the inorganic fibers tends to become higher, and it becomes possible to further prevent untangled inorganic fibers, and consequently to further improve the strength of the honeycomb structure.

The tensile strength of the honeycomb structure according to the embodiments of the present invention is preferably about 0.3 MPa or more, more preferably, about 0.4 MPa or more.

The tensile strength of about 0.3 MPa or more tends to provide sufficient reliability to a honeycomb filter using the above-mentioned honeycomb structure.

Here, the tensile strength can be measured by measuring the honeycomb structure formed into a sheet shape with the two ends thereof fixed by jigs, by using an INSTRON type universal tensile meter.

With respect to the fiber length of the inorganic fibers of the honeycomb structure according to the embodiments of the present invention, a preferable lower limit value is about 0.1 mm, and a preferable upper limit value is about 100 mm.

The fiber length of about 0.1 mm or more tends not to make it difficult to firmly fix the inorganic fibers to one another by interposing an inorganic material, and tends to provide sufficient strength; in contrast, the fiber length of about 100 mm or less makes it easier to manufacture a homogeneous honeycomb structure, and consequently to provide a honeycomb structure having sufficient strength.

A more preferable lower limit value of the fiber length is about 0.5 mm, and a more preferable upper limit value is about 50 mm.

With respect to the fiber diameter of the inorganic fibers, a preferable lower limit value is about 0.3 μm, and a preferable upper limit value is about 30 μm.

The fiber diameter of about 0.3 μm or more tends not to cause the inorganic fiber to be easily broken, with the result that the obtained honeycomb structure becomes less vulnerable to wind erosion; in contrast, the fiber diameter of about 30 μm or less tends not to make it difficult for inorganic fibers to be firmly fixed to one another by interposing an inorganic material, making it easier to provide sufficient strength. The more preferable lower limit value of the fiber diameter is about 0.5 μm, and the more preferable upper limit value thereof is about 15 μm.

With respect to the apparent density of the honeycomb structure, a preferable lower limit value is about 0.04 g/cm3 and a preferable upper limit value is about 0.4 g/cm3.

The apparent density of about 0.04 g/cm3 or more tends not to cause insufficient strength and consequently tends to make the resulting product less vulnerable to damages or breakable. Further, the apparent density of about 0.4 g/cm3 or less is preferable since this level is suitable for continuously burning PM.

Here, the apparent density refers to a value obtained by dividing the mass (g) of a sample by the apparent volume (cm3) of the sample, and the apparent volume refers to a volume including through holes and pores of the sample.

With respect to the porosity of the honeycomb structure according to the embodiments of the present invention, a preferable lower limit is about 75%, and a preferable upper limit is about 95%.

The porosity of about 75% or more makes it easier to raise the inner temperature of the honeycomb filter to a temperature required for burning PM in regenerating a honeycomb filter, and also makes it easier for PM to enter the inside of each pore, with the result that the continuous regenerating capability of the honeycomb filter is improved. In contrast, the porosity of about 95% or less tends not to make the occupying rate of pores too high, making it easier to properly maintain the strength of the entire honeycomb structure.

In addition, the average pore diameter of the honeycomb structure is not particularly limited, and the lower limit is preferably about 1 μm, and the upper limit is preferably about 100 μm. When the average pore diameter is about 1 μm or more, PM tends to be filtered at the deep layers inside the wall portion of the through holes (the cell wall), with the result that the PM tends to be made in contact with the catalyst supported on the inside of the cell wall. On the other hand, when the average pore diameter is about 100 μm or less, PM tends not to pass through the pores and thus the PM is more likely to be captured sufficiently, resulting in surely functioning as a filter.

Here, the above-mentioned porosity and the average pore diameter can be measured through known methods such as a measuring method using a mercury porosimeter, Archimedes method and a measuring method using a scanning electron microscope (SEM).

Moreover, in the honeycomb structure, the distance between adjacent through holes (that is, the thickness of a cell wall) is preferably about 0.2 mm or more. The distance of about 0.2 mm or more tends not to cause degradation in the strength of the honeycomb structure.

Here, with respect to the distance between adjacent through holes (the thickness of the cell wall), a preferable upper limit is about 5.0 mm. When the thickness of the cell wall is not too high, at least one of the aperture ratio and the filtration area of each cell become larger, tending not to cause an increase in pressure loss. Moreover, ashes generated upon burning of PM tend not to enter the pores deeply, making it easier to draw the ashes.

In the honeycomb structure according to the embodiments of the present invention, with respect to the density of the through holes (cells) on a plane perpendicular to the forming direction of the through holes, not particularly limited, a preferable lower limit is about 0.16 pcs/cm2 (about 1.0 pcs/in2), and a preferable upper limit is about 93.0 pcs/cm2 (about 600.0 pcs/in2). A more preferable lower limit is about 0.62 pcs/cm2 (about 4.0 pcs/in2), and a more preferable upper limit is about 77.5 pcs/cm2 (about 500.0 pcs/in2).

Moreover, in the honeycomb structure according to the embodiments of the present invention, with respect to the size of the through hole (cells) on a plane perpendicular to the forming direction of the through holes, not particularly limited, a preferable lower limit is about 0.8 mm×about 0.8 mm, and a preferable upper limit is about 16.0 mm×about 16.0 mm.

In the case where irregularities are formed on the inner surface of each of the through holes forming the honeycomb structure according to the embodiments of the present invention, the filtration area tends to be made larger so that in capturing PM, presumably, the pressure loss can be further lowered. Moreover, the irregularities tend to allow the exhaust gases flow to form a turbulent flow, making it easier to reduce the temperature difference in the honeycomb filter and consequently to prevent damages due to thermal stress.

Here, the shape of the above-mentioned through holes in a plan view is not particularly limited to a square shape, and any desired shape such as a triangular shape, a hexagonal shape, an octagonal shape, a dodecagonal shape, a round shape, an elliptical shape and a star shape may be used.

The honeycomb structure according to the embodiments of the present invention is preferably designed to have a heat-resistant temperature of about 1200° C. or more.

The heat-resistant temperature of about 1200° C. or more tends not to cause a breakage such as melting down in the honeycomb structure when a regenerating treatment is carried out especially in burning a large amount of PM at one time.

With respect to the kind of the catalyst which can be supported on the honeycomb structure according to the embodiments of the present invention, not particularly limited, an oxide catalyst containing at least $CeO_2$ is preferably used.

The oxide catalyst is not particularly limited as long as it can lower the burning temperature of PM, and examples thereof include $CeO_2$, $K_2O$, $ZrO_2$, $FeO_2$, $Fe_2O_3$, $CuO$, $CuO_2$, $Mn_2O_3$, $MnO$, complex oxides indicated by a composition formula $A_nB_{1-n}CO_3$ (in the formula, A is La, Nd, Sm, Eu, Gd or Y; B is an alkali metal or alkali-earth metal; C is Mn, Co, Fe or Ni; and $0 \leq n \leq 1$), and the like.

Each of these catalysts may be used alone, or two or more kinds of these may be used in combination; however, the catalyst preferably contains at least $CeO_2$.

By supporting an oxide catalyst of this kind, the burning temperature of PM in regenerating treatment of the honeycomb filter may be lowered more easily.

The amount of the supported catalyst is preferably at least about 10 g/l and at most about 200 g/l with respect to the apparent volume of the honeycomb structure according to the embodiments of the present invention.

The amount of the supported catalyst of about 10 g/l or more causes less portions of the honeycomb structure in which no catalyst is supported, tending not to cause a reduction in the possibility of PM coming into contact with the catalyst and tending to sufficiently lower the burning temperature of PM. In contrast, even when the amount thereof is more than about 200 g/l, the possibility of contact efficiency between PM and the catalyst is not improved so much; therefore, the amount of about 200 g/l or less is desirable.

Further, a catalyst including a noble metal catalyst such as platinum, palladium and rhodium may be supported on the honeycomb structure according to the embodiments of the present invention, and both of the oxide catalyst and the noble metal catalyst may be supported on the honeycomb structure according to the embodiments of the present invention.

The apparatus to be used for manufacturing an elongated honeycomb molded body in the manufacturing process of the honeycomb structure according to the embodiments of the present invention is not particularly limited, and for example, a single-axis screw-type extrusion-molding machine, a multi-axis screw-type extrusion-molding machine, a plunger-type molding machine and the like may be used. Out of these, in particular, the plunger-type molding machine is preferably used.

The cutting member to be used in cutting of the elongated honeycomb molded body according to the embodiments of the present invention is not particularly limited, and for example, a cutter having a blade formed in the cutting portion, a laser beam, a linear member, or the like may be used. Moreover, a cutter that uses a rotary disc for cutting may also be used.

With respect to the drying apparatus used in the process for manufacturing the honeycomb structure according to the embodiments of the present invention and the lamination member, although not particularly limited, for example, a microwave heat drying apparatus, a hot-air drying apparatus, an infrared ray drying apparatus or the like may be used, and a plurality of these apparatuses may be used in combination.

When drying precursors of the honeycomb molded body and the lamination member in the process for manufacturing the honeycomb structure according to the embodiments of the present invention and the lamination member, the drying apparatus is preferably placed so that the hot air is directed to each of the constituent members in the forming direction of the through holes thereof so as to allow the hot air to pass through the through holes. By allowing the hot air to pass through the through holes, the drying process is carried out efficiently.

Normally, in the process for manufacturing the honeycomb structure according to the embodiments of the present invention, the degreasing process is preferably carried out in an oxidizing atmosphere such as normal atmosphere so as to oxidatively decompose the organic substances. With respect to the degreasing furnace, not particularly limited, a batch-type degreasing furnace may be used; however, in order to continuously carry out the process, a continuous furnace provided with a belt conveyor is preferably used. The degreasing process is preferably carried out by conducting a drying process at a set temperature of at least about 200° C. and at most about 600° C. under normal atmosphere for at least about 1 hour and at most about 5 hours.

In the process for manufacturing the honeycomb structure according to the embodiments of the present invention, an acid treatment may be carried out on the manufactured honeycomb molded body, if needed.

By carrying out the acid treatment, the heat resistance of the honeycomb molded body can be improved.

The acid treatment is carried out by immersing the honeycomb molded body in a solution such as a hydrochloric acid solution and a sulfuric acid solution.

With respect to the conditions of the acid treatment, in the case where inorganic glass is used as the inorganic material, the concentration of the treatment solution is preferably at least about 1 mol/l and at most about 10 mol/l, the treating time is preferably at least about 0.5 hours and at most about 24 hours, and the treatment temperature is preferably at least about 70° C. and at most about 100° C.

By carrying out the acid treatment under these conditions, components other than silica are eluted so that the heat resistance of the molded body is consequently improved.

The above-mentioned acid treatment may be carried out during the firing of the honeycomb molded body. More specifically, the following processes are preferably carried out: a primary firing process is carried out at about 950° C. for about five hours, and the acid treatment is then carried out, and a heating treatment is again carried out at about 1050° C. for about five hours as a secondary firing process. These processes tend to improve the heat resistance of the honeycomb molded body.

The lamination member forming the honeycomb filter according to the embodiments of the present invention mainly includes inorganic fibers.

As the inorganic fibers, not particularly limited, those containing the same material as the honeycomb structure according to the embodiments of the present invention may be used.

The lamination member according to the embodiments of the present invention may include a slight amount of inorganic particles and metal particles. Examples of the inorganic particles include carbides, nitrides, oxides and the like, more specifically, inorganic particles including silicon carbide, silicon nitride, boron nitride, alumina, silica, zirconia, titania and the like. Examples of metal particles include metal silicon, aluminium, iron, titanium and the like. Each of these may be used alone, or two or more kinds of these may be used in combination.

As the inorganic fibers forming the lamination member, those having the same fiber length or the same fiber diameter as the inorganic fibers which are suitably used for forming the honeycomb structure according to the embodiments of the present invention may be suitably used.

Apparent density, porosity, average pore diameter, distance between the adjacent through holes (thickness of a wall), density of the through holes, width of the through holes, and the shape of the through holes in a plan view of the lamination member are preferably the same as those of the honeycomb structure according to the embodiments of the present invention.

The same kind of catalyst as the catalyst supported on the honeycomb structure according to the embodiments of the present invention may be supported on the lamination member, and the preferable range of the amount of the supported catalyst with respect to the apparent volume of the lamination member is the same as that of the honeycomb structure according to the embodiments of the present invention.

In the honeycomb filter according to the embodiments of the present invention, the lamination member may be adhesively laminated by using an inorganic adhesive material and the like, and also, may be just physically laminated.

As the material of the end member forming the honeycomb filter according to the embodiments of the present invention, not particularly limited, a plate member having a dense structure is preferably used.

Here, in the present description, the dense structure refers to a material having porosity smaller than those of the honeycomb structure and the lamination member. More specifically, examples thereof include metal, ceramic, and the like.

In a case where the plate member having a dense structure is used, the end member can be made thinner.

Further, the end member preferably includes a metal having a dense structure.

When an end member including a metal is used, the end member is less likely to suffer wind erosion even after a long time use.

Further, the end member may have at least one of a welding area and a screw hole for being fixed to the end portion of the metal casing by at least one of welding and a screw.

Examples of a method for manufacturing the end member including metal and having through holes formed in a checkered pattern include a method in which a laser machining process or a punching process is carried out on a porous metal plate mainly including metal having a thickness of at least about 0.1 mm and at most about 20 mm.

With respect to the material for the metal casing forming the honeycomb filter according to the embodiments of the present invention, not particularly limited, examples thereof include, for example, metals such as stainless steel (SUS), aluminum and iron. Although the shape thereof is not particularly limited, it is preferable to use the metal casing having an internal diameter virtually same length as the diameter of the honeycomb structure and of the lamination member.

Further, the metal casing and the end member may be in a shape suitable for being fixed by at least one of welding and a screw, and the metal casing may have at least one of a welding area and a screw hole.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pillar-shaped honeycomb filter comprising:
a pillar-shaped honeycomb structure integrally formed and comprising a wall portion defining a plurality of through holes which extend substantially along a longitudinal direction of the honeycomb structure, the honeycomb structure comprising inorganic fibers that are oriented substantially along the longitudinal direction;
first and second lamination members each having a plurality of aligned through holes which extend substantially along the longitudinal direction and comprising inorganic fibers that are oriented substantially along a direction perpendicular to the longitudinal direction, the first and second lamination members being provided at first and second end faces of said honeycomb structure, respectively to align the aligned through holes with the through holes of said honeycomb structure; and a metal casing containing said honeycomb structure and said lamination member, first and second end members, having through holes, connected to first and second end portions of said metal casing, respectively to secure said honeycomb structure and said lamination member, each of through holes of said honeycomb filter formed by said honeycomb structured body, first and second lamination members, and first and second end members being sealed at either one end portion.

2. The honeycomb filter according to claim 1, wherein a length of the first lamination members and a length of the second lamination members in the longitudinal direction are at least about 1% and at most about 10% of a length of said honeycomb structure in the longitudinal direction, respectively.

3. The honeycomb filter according to claim 1, wherein each of the through holes is sealed at either one end portion of the honeycomb filter by said first and second end members.

4. The honeycomb filter according to claim 3, wherein
in the first and second lamination members, through holes each having a virtually same shape as the through holes of said honeycomb structure are formed in a checkered pattern, and the through holes are formed in number almost half as many as the number of the through holes of said honeycomb structure.

5. The honeycomb filter according to claim 1, wherein
each of the through holes is sealed at either one end portion of the honeycomb filter by said first and second end members and said first and second lamination members.

6. The honeycomb filter according to claim 1, wherein
said first and second end members are fixed to said metal casing by at least one of welding and a screw.

7. The honeycomb filter according to claim 1, wherein
a catalyst is supported on the honeycomb filter.

8. The honeycomb filter according to claim 7, wherein
said catalyst comprises an oxide catalyst containing at least $CeO_2$.

9. The honeycomb filter according to claim 7, wherein
said catalyst comprises at least one of $CeO_2$, $K_2O$, $ZrO_2$, $FeO_2$, $Fe_2O_3$, CuO, $CuO_2$, $Mn_2O_3$, MnO, and complex oxides indicated by a composition formula $A_nB_{1-n}CO_3$, wherein A is La, Nd, Sm, Eu, Gd or Y, B is an alkali metal or alkali-earth metal, C is Mn, Co, Fe, or Ni, and $0 \leq n \leq 1$.

10. The honeycomb filter according to claim 7, wherein
a noble metal catalyst is supported on the honeycomb filter, or both an oxide catalyst containing at least $CeO_2$ and a noble metal catalyst are supported on the honeycomb filter.

11. The honeycomb filter according to claim 1, wherein
said honeycomb structure further comprises an inorganic material, and said inorganic fibers are fixed and adhered to one another by interposing said inorganic material.

12. The honeycomb filter according to claim 11, wherein
in said honeycomb structure, said inorganic material is melted and solidified to fix an intersection between said inorganic fibers or a vicinity of said inorganic fibers.

13. The honeycomb filter according to claim 11, wherein
said inorganic material is melted at a temperature at which said inorganic fibers are not melted or sublimated.

14. The honeycomb filter according to claim 1, wherein
said lamination member further comprises an inorganic material, and said inorganic fibers are fixed and adhered to one another by interposing said inorganic material.

15. The honeycomb filter according to claim 14, wherein
said inorganic material is melted at a temperature at which said inorganic fibers are not melted or sublimated.

16. The honeycomb filter according to claim 13, wherein
said inorganic material contains silica.

17. The honeycomb filter according to claim 16, wherein
said inorganic material comprises one of silicate glass, silicate alkali glass, and borosilicate glass.

18. The honeycomb filter according to claim 1, wherein
said first and second lamination members comprise a sheet-shaped member.

19. The honeycomb filter according to claim 1, wherein
said first and second end members comprise a plate member having a dense structure.

20. The honeycomb filter according to claim 1, wherein
a material of inorganic fibers of said honeycomb structure and said first and second lamination members comprises at least one of an oxide ceramic, a nitride ceramic, a carbide ceramic, and basalt.

21. The honeycomb filter according to claim 20, wherein
a material of inorganic fibers of said honeycomb structure and said first and second lamination members comprises at least one of silicon carbide, alumina, basalt, silica, silica-alumina, titania and zirconia.

22. The honeycomb filter according to claim 1, wherein
a tensile strength of said honeycomb structure is about 0.3 MPa or more.

23. The honeycomb filter according to claim 1, wherein
said first and second lamination members further comprise inorganic particles and metal particles.

24. The honeycomb filter according to claim 23, wherein
a material of said inorganic particles comprises at least one of silicon carbide, silicon nitride, boron nitride, alumina, silica, zirconia, and titania.

25. The honeycomb filter according to claim 23, wherein
said metal particles comprise one of metal silicon, aluminium, iron, and titanium.

26. The honeycomb filter according to claim 1, wherein
said first and second lamination members are adhesively laminated by using an inorganic adhesive material or physically laminated.

* * * * *